United States Patent
Aymonier et al.

(10) Patent No.: US 10,221,072 B2
(45) Date of Patent: Mar. 5, 2019

(54) PROCESS FOR THE CONTINUOUS PREPARATION OF PHYLLOMINERAL SYNTHETIC PARTICLES

(71) Applicants: CENTRE NATIONAL DE LA RECHERCHE SCIENTIFIQUE (C.N.R.S.), Paris (FR); UNIVERSITE PAUL SABATIER TOULOUSE III, Toulouse (FR)

(72) Inventors: Cyril Aymonier, Begles (FR); Cedric Slostowski, Bon-encontre (FR); Angela Dumas, Pechabou (FR); Pierre Micoud, Peyssies (FR); Christophe Le Roux, Avignonet Lauragais (FR); Francois Martin, Sainte Foy D'aigrefeuille (FR)

(73) Assignees: CENTRE NATIONAL DE LA RECHERCHE SCIENTIFIQUE (C.N.R.S), Paris (FR); UNIVERSITE PAUL SABATIER TOULOUSE III, Toulouse (FR)

( * ) Notice: Subject to any disclaimer, the term of this patent is extended or adjusted under 35 U.S.C. 154(b) by 93 days.

(21) Appl. No.: 15/304,124

(22) PCT Filed: Apr. 13, 2015

(86) PCT No.: PCT/FR2015/050984
§ 371 (c)(1),
(2) Date: Nov. 22, 2016

(87) PCT Pub. No.: WO2015/159006
PCT Pub. Date: Oct. 22, 2015

(65) Prior Publication Data
US 2017/0066655 A1     Mar. 9, 2017

(30) Foreign Application Priority Data
Apr. 14, 2014   (FR) ..................... 14 53334

(51) Int. Cl.
*C01B 33/22*       (2006.01)
*C01B 33/38*       (2006.01)
(Continued)

(52) U.S. Cl.
CPC .............. *C01B 33/22* (2013.01); *C01B 33/38* (2013.01); *C01B 33/40* (2013.01); *C01B 33/42* (2013.01)

(58) Field of Classification Search
CPC ......... C01B 33/22; C01B 33/38; C01B 33/40; C01B 33/42
See application file for complete search history.

(56) References Cited

U.S. PATENT DOCUMENTS

| 5,453,262 A * | 9/1995 | Dawson .............. C04B 35/4682 |
| | | 252/62.9 PZ |
| 2006/0147367 A1 | 7/2006 | Temperly et al. |
| 2014/0205528 A1 | 7/2014 | Le Roux et al. |

FOREIGN PATENT DOCUMENTS

| JP | 06-345419 A | 12/1994 |
| WO | 2004/056704 A1 | 7/2004 |
| WO | 2013/004979 A1 | 1/2013 |

OTHER PUBLICATIONS

Furusawa et al., "Continuous Manufacture of Swelling Silicates," Database CA [Online] Chemical Abstracts Service, Columbus, Ohio, Apr. 29, 1995.
(Continued)

*Primary Examiner* — Anthony J Zimmer
(74) *Attorney, Agent, or Firm* — Young & Thompson

(57) ABSTRACT

A process for preparing phyllomineral synthetic particles formed from constituent chemical elements in stoichiometric proportions including at least one chemical element selected from the group formed from silicon and germanium, and at least one chemical element selected from the group formed from divalent metals and trivalent metals, by (Continued)

Figure 1:
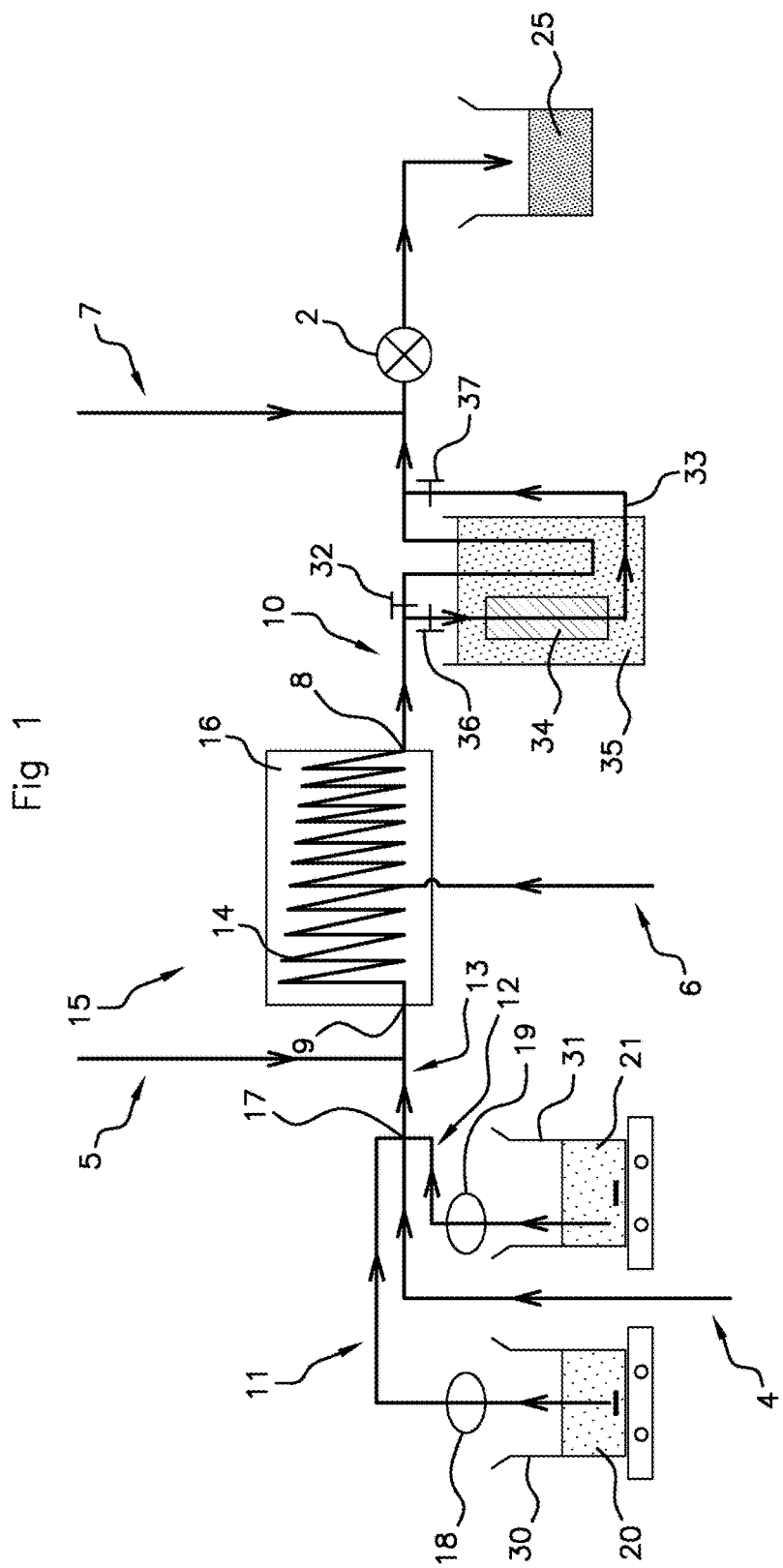

a continuous solvothermal treatment at a pressure above 1 MPa and at a temperature between 100° C. and 600° C., by making the reaction medium circulate continuously in a solvothermal treatment zone of a continuous reactor (15) with a residence time of the reaction medium in the solvothermal treatment zone that is suitable for continuously obtaining, at the outlet of the solvothermal treatment zone, a suspension including the phyllomineral synthetic particles.

15 Claims, 11 Drawing Sheets

(51) Int. Cl.
*C01B 33/40* (2006.01)
*C01B 33/42* (2006.01)

(56) References Cited

OTHER PUBLICATIONS

International Search Report issued in Application No. PCT/FR2015/050984 dated Jul. 31, 2015.

\* cited by examiner

PROCESS FOR THE CONTINUOUS PREPARATION OF PHYLLOMINERAL SYNTHETIC PARTICLES The invention relates to a process for preparing phyllomineral synthetic particles such as phyllosilicates.

Many minerals such as borates or silicates are used in various industrial fields. Phyllosilicate mineral particles, such as talc, are used, for example, in the form of fine particles in many industrial sectors, such as: thermoplastics, elastomers, paper, paint, varnish, textiles, metallurgy, pharmacy, cosmetics, plant protection products or alternatively fertilizers in which phyllosilicates such as talc are used, by incorporation into a composition, as inert filler (for their chemical stability or alternatively for the dilution of active compounds of higher cost) or as functional fillers (for example for reinforcing the mechanical properties of certain materials).

Throughout the text, the term "phyllomineral particle" means any mineral particle having a crystalline structure comprising at least one tetrahedral layer and at least one octahedral layer. They may be, for example, phyllosilicates.

Throughout the text, the term "non-swelling" refers to any phyllosilicate or any mineral particle whose (001) diffraction line is not affected by a treatment by placing in contact with ethylene glycol or glycol, i.e. whose interatomic distance corresponding to the (001) (x-ray) diffraction line does not increase after it has been placed in contact with ethylene glycol or glycol. 2:1 phyllosilicates, with the exception of smectites, are non-swelling; this concerns, for example, talc or other phyllosilicates belonging to the mica group such as muscovite.

Natural talc, which is a hydroxylated magnesium silicate of formula $Si_4Mg_3O_{10}(OH)_2$, belongs to the phyllosilicate family. Phyllosilicates are constituted by a regular stack of elementary sheets of crystalline structure, the number of which varies from a few units to several thousand units. Among phyllosilicates (lamellar silicates), the group especially comprising talc, mica and montmorillonite is characterised in that each elementary sheet is constituted by the association of two layers of tetrahedra located on either side of a layer of octahedra. This group corresponds to 2:1 phyllosilicates, of which smectites especially form part. Given their structure, 2:1 phyllosilicates are also termed as being of T.O.T. (tetrahedron-octahedron-tetrahedron) type. Smectites are characterised especially by the presence, between the elementary sheets, of interfoliar spaces which contain water and cations and in which the swelling property of the mineral is involved.

The octahedral layer of 2:1 phyllosilicates is formed from two planes of $O^{2-}$ and $OH^-$ ions (in an $O^{2-}/OH^-$ molar proportion of 2/1). On either side of this median layer are arranged two-dimensional networks of tetrahedra, one of the apices of which is occupied by an oxygen of the octahedral layer, while the other three are occupied by substantially coplanar oxygens.

For the majority of their applications, phyllosilicates, and especially talc, of high purity, having fine particles (micrometric or even sub-micrometric in at least one direction) and good structural and crystalline properties, are sought.

WO 2013/004979 describes a process for preparing a composition comprising synthetic mineral particles such as talc via a co-precipitation reaction of a precursor hydrogel in the presence of a carboxylate salt followed by a hydrothermal treatment of said precursor hydrogel at a temperature of 300° C. and an autogenous pressure of about 8 MPa. A process according to WO 2013/004979 makes it possible to obtain synthetic mineral particles with satisfactory structural properties, especially close to those of natural talcs. This process also makes it possible to reduce the time for preparing the synthetic mineral particles (from 3 hours to 10 days) and constitutes the fastest known process for obtaining phyllosilicate particles. A time of several days and/or anhydrous heat treatment (annealing) at 550° C. for 5 hours is required to increase the crystallinity of the synthesised particles so as to approach the structural characteristics of a natural talc.

However, it is necessary to improve the compatibility of a process for synthesising such synthetic mineral particles with high industrial requirements, in terms of efficacy, cost-effectiveness and structural qualities of the synthetic mineral particles obtained.

In this context, the invention is directed toward proposing a process for preparing phyllomineral synthetic particles in larger amounts and/or in shorter times than for the other processes of the prior art.

The invention is also directed toward proposing a process for preparing phyllomineral synthetic particles, the time for which is considerably shorter than the preparation time required in a process for preparing such particles described in the prior art.

The invention is thus directed toward proposing such a process that is quick and simple to implement and that is compatible with the constraints of exploitation at the industrial scale.

The invention is directed toward proposing a process for preparing phyllomineral synthetic particles of high purity and having lamellarity, a fine particle size of low dispersion, and also a crystalline structure very close to those of natural phyllominerals, especially natural phyllosilicates, and in particular natural talc.

The invention is also directed toward proposing a preparation process for precisely adjusting the characteristics of the phyllomineral synthetic particles, especially of the phyllosilicate synthetic particles, obtained.

The invention is also directed toward proposing a process for preparing compositions comprising phyllomineral synthetic particles which have structural properties very similar to those of natural phyllosilicates and in particular of talc.

The invention is also directed in particular toward proposing a process for preparing compositions comprising phyllosilicate synthetic mineral particles that can be used in replacement for natural talc compositions, in various applications thereof.

The invention is thus also directed toward proposing compositions obtained via a process according to the invention.

To do this, the invention concerns a process for preparing phyllomineral synthetic particles, formed from chemical elements, named constituent chemical elements, in predetermined proportions, named stoichiometric proportions, said constituent chemical elements comprising at least one chemical element selected from the group consisting of silicon and germanium, and at least one chemical element selected from the group consisting of divalent metals and trivalent metals, via a treatment, named a solvothermal treatment, of a reaction medium comprising a liquid medium and containing said stoichiometric proportions of said constituent chemical elements of said phyllomineral synthetic particles, said phyllomineral synthetic particles belonging to the group of non-swelling phyllosilicates, and in particular belonging to the group of non-swelling 2:1 phyllosilicates, in which:

said solvothermal treatment is performed continuously at a pressure greater than 1 MPa and at a temperature of between 100° C. and 600° C., the reaction medium is continuously circulated in a zone, named the solvothermal treatment zone, of a continuous reactor with a residence time of the reaction medium in said solvothermal treatment zone that is suitable for continuously obtaining, at the outlet of said solvothermal treatment zone, a suspension comprising said phyllomineral synthetic particles.

Specifically, the inventors have found surprisingly that a process according to the invention makes it possible to obtain phyllomineral synthetic particles that have noteworthy structural and crystalline properties, and especially structural properties that may be very similar to those of natural phyllosilicates and especially of a natural talc, continuously and within a surprisingly short time, of a few seconds to a few minutes, whereas times of several hours (typically about 6 hours in WO 2013/004979), or even several days, which in principle are incompatible with continuous implementation, were hitherto considered as being necessary for obtaining sufficient transformation of a reaction medium comprising a liquid medium containing said stoichiometric proportions of said constituent chemical elements of said phyllomineral synthetic particles.

This is thus the first synthesis of such phyllomineral synthetic particles—especially of phyllosilicates—continuously, i.e. of lamellar particles comprising at least one tetrahedral layer associated with at least one octahedral layer.

This result is all the more surprising since it is in principle necessary to dilute the reaction medium more substantially than in the case of the batch processes of the prior art, this dilution making it possible to facilitate the continuous feeding and continuous circulation of the reaction medium in the reactor. A process according to the invention also makes it possible to prepare phyllosilicate particles whose properties and characteristics may be finely adjusted, especially as a function of the duration of the solvothermal treatment (residence time), and to do so with a solvothermal treatment at reduced temperatures, which were hitherto considered as insufficient.

Advantageously and according to the invention, said phyllomineral synthetic particles comprise 4 silicon and/or germanium atoms per 3 atoms of said metal M, i.e. they have the stoichiometry of talc (i.e. 4 silicon atoms per 3 magnesium atoms). In particular, advantageously and according to the invention, said phyllomineral synthetic particles have a zero charge, and do not have any cationic deficit or any cations located in the interfoliar spaces (interfoliar cations). More particularly, advantageously and according to the invention, said phyllomineral synthetic particles are free of fluorine and of metals (or metal cations) other than said metal M, said phyllomineral synthetic particles especially being free of lithium and calcium. The constituent chemical elements of said phyllomineral synthetic particles are thus especially free of fluorine, lithium and calcium.

In particular, advantageously and according to the invention, the reaction medium circulating in the solvothermal treatment zone is free of fluorine and lithium.

Throughout the text, the term "continuous reactor" means any reactor that makes it possible to work with continuous streams and that allows mixing of the chemical species present in the reaction medium.

Any known continuous reactor may be used in a process according to the invention. Thus, advantageously and according to the invention, said continuous reactor is a constant-volume continuous reactor. In a particularly advantageous variant of a process according to the invention, the continuous reactor used is chosen from the group formed from piston reactors (or reactors of piston-flow type). Such a piston reactor is adapted so that all the chemical species of the reaction medium containing said stoichiometric proportions of said constituent chemical elements of said phyllomineral synthetic particles introduced simultaneously into the solvothermal treatment zone have the same residence time in the solvothermal treatment zone. It may be a case, for example, of tubular reactors in which the flow of the reaction medium takes place under a laminar, turbulent or intermediate regime. In addition, it is possible to use any co-current or counter-current reactor as regards the introduction and placing in contact of the various compositions and/or liquid media placed in contact in a process according to the invention.

The solvothermal treatment zone of the reactor has at least one inlet suitable for allowing the continuous introduction of at least one starting composition into said solvothermal treatment zone of the reactor, and at least one outlet via which said suspension comprising said phyllomineral synthetic particles is continuously recovered. The reaction medium comprising a liquid medium and said stoichiometric proportions of said constituent chemical elements of said phyllomineral synthetic particles present in the solvothermal treatment zone of the reactor is formed from at least one starting composition and is subjected to said solvothermal treatment, i.e. to heating under pressure, so as to evolve spontaneously and continuously solely under the effect of this solvothermal treatment, into a suspension of phyllomineral synthetic particles that is continuously delivered at the outlet of the solvothermal treatment zone of the reactor.

Thus, advantageously and according to the invention, the solvothermal treatment zone of the reactor comprises at least one pipe, named the reaction pipe, in which the reaction medium continuously circulates between at least one inlet suitable for allowing the continuous introduction of at least one starting composition and at least one outlet via which the suspension comprising said phyllomineral synthetic particles is continuously recovered. Said reaction pipe may be, for example, in the form of a tube or a duct whose diameter and shape are suitable for allowing circulation of the reaction medium between at least one inlet and at least one outlet of the solvothermal treatment zone.

Advantageously and according to the invention, said solvothermal treatment is performed by circulating said reaction medium in said reaction pipe, extending between at least one inlet for introduction of at least one starting composition and at least one outlet for recovery of said suspension of phyllomineral synthetic particles. The residence time of the reaction medium in said solvothermal treatment zone of the reactor is thus adjusted as a function of the internal volume of this reaction pipe between the inlet and the outlet, the flow rate and the mass per unit volume of the reaction medium circulating in this reaction pipe.

Advantageously and according to the invention, the pressure of the solvothermal treatment is controlled by controlling the pressure prevailing inside said reaction pipe, for example by means of a pressure regulator. In particular, the pressure is controlled so that the pressure prevailing inside said reaction pipe is greater than the saturating vapour pressure of the liquid medium.

Advantageously and according to the invention, the temperature of the solvothermal treatment is controlled by controlling the temperature of the reaction pipe. The temperature may be controlled via any suitable means, for example by placing said reaction pipe inside a chamber in which the temperature is controlled. Other embodiments are possible, for example by equipping said reaction pipe with a jacket and controlling the temperature of the jacket.

The temperature of the reaction medium in the reactor is suitable for allowing the production of said phyllomineral synthetic particles, as a function especially of the pressure and the residence time during which the solvothermal treatment is performed. In particular, advantageously and according to the invention, said solvothermal treatment is performed at a temperature of between 200° C. and 600° C., especially between 250° C. and 450° C., and in particular between 350° C. and 400° C. For example, advantageously and according to the invention, the reaction pipe extends into a chamber, and the temperature inside the chamber is controlled to a value of between 100° C. and 600° C., especially between 200° C. and 500° C., and more particularly between 350° C. and 400° C.

Advantageously and according to the invention, the temperature and pressure of the solvothermal treatment are controlled by controlling the temperature of the reaction pipe and, respectively, the pressure prevailing inside said reaction pipe.

Advantageously and according to the invention, the characteristics and the amount of liquid medium in the reaction medium are suitable for allowing continuous introduction of at least one starting composition into the solvothermal treatment zone of the reactor—especially in the reaction pipe—and continuous circulation of the reaction medium in the solvothermal treatment zone of the reactor—especially in the reaction pipe—up to an outlet therefrom. In particular, advantageously and according to the invention, the reaction medium has a suitable viscosity (via a suitable choice of the liquid medium and/or adjustment of the amount of liquid medium) so as to allow its continuous flow at the inlet of the solvothermal treatment zone of the reactor, especially at the inlet of the reaction pipe, and continuous circulation of the reaction medium resulting therefrom in the reactor, especially in the reaction pipe. In addition, the viscosity of the reaction medium is also chosen so as to allow the production of a suspension of phyllomineral synthetic particles at the reactor outlet, which is capable of flowing from this outlet, at least given the feed pressure.

The reaction medium may be formed from one or more starting compositions. Advantageously and according to the invention, each starting composition comprises a liquid medium and at least part of said stoichiometric proportions of said constituent chemical elements of said phyllomineral synthetic particles. Each starting composition is chosen so that all of said starting compositions comprise said stoichiometric proportions of said constituent chemical elements of said phyllomineral synthetic particles. If the reaction medium is formed from a single starting composition, said composition must then comprise all the constituent chemical elements in stoichiometric proportions of said constituent chemical elements of said phyllomineral synthetic particles, i.e. the stoichiometric proportions of at least one chemical element chosen from the group formed from silicon and germanium, and of at least one chemical element chosen from the group of divalent and trivalent metals.

In a particularly advantageous variant of a process according to the invention, the reaction medium is prepared continuously from at least one first starting composition comprising at least one mineral compound chosen from silicates and/or germanates, solid solutions thereof and mixtures thereof, and of at least one second starting composition comprising at least one metal salt of at least one metal M (in particular a divalent or trivalent metal), said first and second compositions being placed in contact continuously upstream of at least one inlet of said solvothermal treatment zone. Two starting compositions may thus be prepared, one comprising at least one compound, named the mineral compound, chosen from silicates and/or germanates, solid solutions thereof and mixtures thereof, and the other comprising at least one metal salt of at least one metal M, or alternatively more than two starting compositions, each starting composition comprising at least one mineral compound chosen from silicates and/or germanates, solid solutions thereof and mixtures thereof and/or at least one metal salt of at least one metal M.

Specifically, the inventors have found surprisingly that it is possible to perform a continuous preparation of the reaction medium, starting with several different starting compositions each containing at least a part of the constituent chemical elements required for the synthesis of the phyllomineral particles, whereas such a continuous implementation in principle requires large dilutions. This dilution before and in the solvothermal treatment zone is generally presumed to be harmful toward obtaining such phyllomineral particles. Specifically, in the starting reaction medium, the constituent chemical elements, which, separately of each other, could not allow the formation of phyllomineral particles and would normally tend to form particles of different structural and/or chemical nature, in fact allow, in the way that they are placed in contact in a process according to the invention, the production of phyllomineral synthetic particles, even in dilute medium.

Advantageously and according to the invention, in each starting composition, the concentration (relative to the volume of the liquid medium) of said constituent chemical elements of said phyllomineral synthetic particles introduced into the inlet of the solvothermal treatment zone of the reactor may especially be between $10^{-3}$ mol/L and several mol/L, for example $10^{-2}$ mol/L or alternatively 1 mol/L.

Advantageously and according to the invention, the reaction medium and each starting composition are at least partially hydrated (the solvothermal treatment of this reaction medium then being termed a hydrothermal treatment). Advantageously and according to the invention, said liquid medium is chosen from water, alcohols and mixtures thereof. In an advantageous variant of a process according to the invention, said alcohols are chosen from linear or branched alcohols, comprising less than 10 carbon atoms, especially comprising less than 7 carbon atoms, in particular from methanol, ethanol, propanol, isopropanol, butanol, pentanol, hexanol, propylene glycol and ethylene glycol. The liquid medium of the starting composition and the liquid medium of the reaction medium may be prepared, for example, solely with water or alternatively with a mixture of water and of at least one alcohol.

The solvothermal treatment of the reaction medium in the solvothermal treatment zone of the reactor is performed at a pressure suitable for allowing the production of said phyllomineral synthetic particles, as a function especially of the temperature and the residence time during which the solvothermal treatment is performed. Advantageously and according to the invention, said solvothermal treatment is performed at a pressure of between 2 MPa and 50 MPa, especially between 8 MPa and 40 MPa, and in particular between 22 MPa and 30 MPa. In this case also, advantageously and according to the invention, this pressure of the solvothermal treatment is controlled by adjusting the pressure inside the reaction pipe in which the reaction medium circulates. Advantageously and according to the invention, the pressure of the solvothermal treatment is controlled by a pressure regulator.

Advantageously and according to the invention, the reaction pipe is continued after exiting the reactor (i.e. a zone in which the reaction pipe is maintained at a temperature corresponding to the temperature of the solvothermal reaction) by a portion equipped with a device for regulating the pressure (for instance a micrometric or needle valve or an automatic pressure regulator) to a value, named the nominal pressure, at which the solvothermal treatment must be performed. The reaction medium is introduced into the reaction pipe at a predetermined flow rate as a function of the residence time, for example by means of at least one delivery pump (volumetric pump). This device makes it possible to control the pressure throughout the continuous synthesis device and especially in the reactor. It also makes it possible to ensure transition between the pressure in the reactor and the ambient pressure on exiting the continuous synthesis device, when the phyllomineral synthetic particles in suspension are recovered or after an optional filtration.

Advantageously and according to the invention, the duration of the continuous solvothermal treatment is adjusted by controlling the residence time of the reaction medium in said solvothermal treatment zone, in which it is subjected to the temperature and pressure of the solvothermal treatment. The residence time of the reaction medium in the solvothermal treatment zone of the reactor is suitable for allowing the continuous production of said phyllomineral synthetic particles, especially as a function of the temperature at which the solvothermal treatment is performed. Advantageously and according to the invention, the reaction medium is continuously circulated in the solvothermal treatment zone of the reactor so that it has a residence time in the solvothermal treatment zone of less than 10 minutes, especially less than 5 minutes and more particularly less than 1 minute.

In the embodiments in which said solvothermal treatment zone is a reaction pipe, the residence time of the reaction medium is determined from the volume of the reaction pipe (between the inlet and the outlet of this reaction pipe) in which the reaction medium circulates, the flow rate imposed in the reaction pipe and the mass per unit volume of the reaction medium (the latter being dependent on the temperature and pressure of the solvothermal treatment).

The relationship linking the volumetric flow rate (Q) to the residence time ($t_s$), to the volume of the reactor ($V_r$), to the mass per unit volume ($\rho_i$) of the reaction medium at the reactor inlet and to the mass per unit volume ($\rho_r$) of the reaction medium in the reactor is the following:

$$Q = \frac{V_r \cdot \rho_r}{t_s \rho_i}.$$

Advantageously and according to the invention, said reaction medium is introduced into the reactor—especially into said reaction pipe—with a flow rate chosen to obtain the appropriate residence time.

Advantageously and according to the invention, said solvothermal treatment is performed under supercritical or subcritical conditions, and in particular homogeneous subcritical conditions.

In a particularly advantageous variant of a process according to the invention, the temperature and pressure at which the solvothermal treatment is performed are chosen so that the reaction medium, and in particular the liquid medium it comprises, is under supercritical conditions. Advantageously and according to the invention, said solvothermal treatment is thus performed under temperature and pressure conditions such that the reaction medium—especially its liquid medium—is under supercritical conditions.

In the presence of an essentially or solely aqueous reaction medium, since the critical point of water (in accordance with the phase diagram of water) is at 22.1 MPa and at 374° C., a hydrothermal treatment is performed in the reactor, for example, at a temperature above 375° C. and at a pressure above 22.3 MPa, so as to be under supercritical conditions.

To perform a hydrothermal treatment under subcritical conditions, a temperature of between 100° C. and 373° C. and a pressure above the saturating vapour pressure of the liquid medium at the chosen temperature (i.e. above the liquid-gas equilibrium curve of the phase diagram of water), especially a pressure above 0.1 MPa, are adopted.

The invention applies to the preparation of all phyllomineral particles that may be obtained by solvothermal treatment (heating and pressure) of a precursor gel comprising said stoichiometric proportions of said constituent chemical elements of said phyllomineral synthetic particles, the transformation of this precursor gel producing said phyllomineral particles on conclusion of the solvothermal treatment. The invention relates more particularly and advantageously to a process for preparing phyllosilicate particles belonging to the group formed from lamellar silicates, lamellar germanates, lamellar germanosilicates and mixtures thereof. Advantageously and according to the invention, a precursor silico/germano-metallic hydrogel is then used as precursor gel, and said solvothermal treatment is performed in the form of a continuous hydrothermal treatment of this precursor silico/germano-metallic hydrogel.

Advantageously and according to the invention, said precursor gel is prepared via a co-precipitation reaction between at least one mineral compound, chosen from silicates, germanates, solid solutions thereof and mixtures thereof, and at least one metal salt of at least one metal M (in particular a divalent or trivalent metal).

A process according to the invention thus makes it possible not only to perform the solvothermal treatment of the precursor gel continuously, but also to prepare this precursor gel continuously. The co-precipitation reaction of the precursor gel is also rapid and thus makes it possible to synthesise said phyllomineral synthetic particles continuously, allowing substantial savings in time.

Advantageously and according to the invention, any compound comprising at least one silicon and/or germanium atom that is suitable for reacting in said co-precipitation reaction of said precursor gel is used as mineral compound. In particular, advantageously and according to the invention, said mineral compound is chosen from the group formed by sodium silicates and silicas (silicon dioxides). In particular, advantageously and according to the invention, sodium metasilicate is used as mineral compound.

In a particularly advantageous variant of a process according to the invention, use is made, as metal salt of at least one metal M, of at least one dicarboxylate salt of formula $M(R_1—COO)_2$ in which:

$R_1$ is chosen from hydrogen (—H) and alkyl groups comprising less than 5 carbon atoms, and M denotes at least one divalent metal having the formula $Mg_{y(1)}Co_{y(2)}Zn_{y(3)}Cu_{y(4)}Mn_{y(5)}Fe_{y(6)}Ni_{y(7)}Cr_{y(8)}$; each $y(i)$ representing a real number of the interval [0; 1], and such that.

$$\sum_{i=1}^{8} y(i) = 1.$$

Advantageously and according to the invention, said co-precipitation reaction is performed in the presence of at least one carboxylate salt of formula $R_2$—COOM' in which:
M' denotes a metal chosen from the group formed from Na and K, and
$R_2$ is chosen from H and alkyl groups comprising less than 5 carbon atoms.

It is found, surprisingly, that this carboxylate salt is not degraded by the solvothermal treatment, and, on the contrary, participates in the efficiency and rapidity of said treatment. The groups $R_1$ and $R_2$ may be identical or different. Advantageously and according to the invention, the groups $R_1$ and $R_2$ are chosen from the group formed by $CH_3$—, $CH_3$—$CH_2$— and $CH_3$—$CH_2$—$CH_2$—. In particular, advantageously and according to the invention, the groups $R_1$ and $R_2$ are identical.

Advantageously and according to the invention, use is made, as precursor gel, of a precursor hydrogel comprising:
4 silicon and/or germanium atoms according to the following chemical formula: 4 $(Si_xGe_{1-x})$, x being a real number of the interval [0; 1],
3 atoms of at least one metal M, M denoting at least one divalent metal having the formula $Mg_{y(1)}Co_{y(2)}Zn_{y(3)}Cu_{y(4)}Mn_{y(5)}Fe_{y(6)}Ni_{y(7)}Cr_{y(8)}$ in which each y(i) represents a real number of the interval [0; 1], and such that $$\sum_{i=1}^{8} y(i) = 1,$$

(10−ε) oxygen atoms ((10−ε) O), ε being a real number of the interval [0; 10],
(2+ε) hydroxyl groups ((2+ε) (OH)), ε being a real number of the interval [0; 10].

Use may thus be made, as chemical formula for such a precursor hydrogel, of the chemical formula (I) below:

4 $(Si_xGe_{1-x})$ 3 M ((10−ε) O) ((2+ε) (OH))        (I).

Water molecules may also be bound to the particles of this precursor hydrogel. These are water molecules that are adsorbed or physisorbed onto the precursor hydrogel particles and not constitution water molecules usually present in the interfoliar spaces of certain phyllosilicate particles.

Another chemical formula for defining said precursor hydrogel is the following formula: $(Si_xGe_{1-x})_4M_3O_{11},n'H_2O$, or alternatively $Si_4M_3O_{11},n'H_2O$ as regards a silico-metallic precursor hydrogel.

Such a precursor silico/germano-metallic hydrogel may be obtained via a co-precipitation reaction between at least one mineral compound, chosen from silicates, germanates, solid solutions thereof and mixtures thereof, and at least one metal salt of at least one divalent metal M.

Advantageously and according to the invention, said solvothermal treatment, in particular a hydrothermal treatment, is performed so as to obtain continuously (after exiting the reactor) a suspension comprising particles of 2:1 phyllosilicate type. In particular, advantageously and according to the invention, said hydrothermal treatment is performed so as to obtain continuously a suspension comprising phyllosilicate particles having the chemical formula (II) below:

$(Si_xGe_{1-x})_4M_3O_{10}(OH)_2$        (II)

in which:
Si denotes silicon,
Ge denotes germanium,
M denotes at least one divalent metal having the formula $Mg_{y(1)}Co_{y(2)}Zn_{y(3)}Cu_{y(4)}Mn_{y(5)}Fe_{y(6)}Ni_{y(7)}Cr_{y(8)}$; each y(i) representing a real number of the interval [0; 1], and such that $$\sum_{i=1}^{8} y(i) = 1,$$

x is a real number of the interval [0; 1].

In other variants of a process according to the invention, use may be made of precursor gels comprising chemical elements in different proportions corresponding to the synthesis of other types of phyllominerals, for example phyllosilicates whose structure is of T.O. type (tetrahedron-octahedron) or alternatively of T.O.T.O. type (tetrahedron-octahedron-tetrahedron-octahedron), by analogy with the 2:1 phyllosilicates of T.O.T. type.

A precursor gel for preparing phyllomineral synthetic particles of T.O. type comprises, for example:
2 silicon and/or germanium atoms according to the following chemical formula: 2 $(Si_xGe_{1-x})$, x being a real number of the interval [0; 1],
3 atoms of at least one metal M, M denoting at least one divalent metal having the formula $Mg_{y(1)}Co_{y(2)}Zn_{y(3)}Cu_{y(4)}Mn_{y(5)}Fe_{y(6)}Ni_{y(7)}Cr_{y(8)}$ in which each y(i) represents a real number of the interval [0; 1], and such that $$\sum_{i=1}^{8} y(i) = 1,$$

(5−ε) oxygen atoms ((5−ε) O), ε being a real number of the interval [0; 5],
(4+ε) hydroxyl groups ((4+ε) (OH)), ε being a real number of the interval [0; 5].

In these precursor gels, the metal M may also denote a trivalent metal such as aluminium (Al), partially or totally substituted for said divalent metal. A precursor gel for preparing phyllomineral synthetic particles of T.O. or T.O.T. type will then comprise 2 atoms of said trivalent metal (instead of 3 atoms of said divalent metal so as to satisfy the electrical neutrality).

Advantageously, in certain embodiments, and according to the invention, the precursor gel is prepared continuously immediately upstream of its introduction into the solvothermal treatment zone. Thus, a process according to the invention makes it possible to perform in a single step continuously, on the one hand, the preparation of the precursor gel, and, on the other hand, the solvothermal treatment of the reaction medium making it possible to obtain continuously a suspension of phyllomineral synthetic particles.

More particularly, advantageously and according to the invention, the reaction medium, and in particular the precursor gel, is prepared continuously, in particular via a co-precipitation reaction, starting with at least one first starting composition comprising at least one compound, named the mineral compound, chosen from silicates and/or germanates, solid solutions thereof and mixtures thereof, and at least one second starting composition comprising at least one metal salt of at least one metal M chosen from the group formed from divalent metals and trivalent metals, said first and second compositions being placed in contact continuously upstream of at least one inlet of said solvothermal treatment zone.

To do this, advantageously and according to the invention, at least one first starting composition of each mineral compound is introduced continuously in at least one first pipe portion; and at least one second starting composition of each metal salt is introduced continuously into at least one second pipe portion, each of the first pipe portion and of the second pipe portion being connected together upstream of the solvothermal treatment zone to allow the continuous placing in contact of these two compositions, so as to form said precursor gel continuously upstream of an inlet of said reaction pipe. Thus, the reactor comprises, upstream of the inlet of the reaction pipe, a first pipe portion into which is continuously introduced a first starting composition comprising each mineral compound, and a second pipe portion into which is continuously introduced a second starting composition comprising each metal salt.

Advantageously and according to the invention, the first starting composition is at least partially hydrated. Advantageously and according to the invention, the second starting composition is at least partially hydrated. Advantageously and according to the invention, the first starting composition is capable of flowing. Advantageously and according to the invention, the second starting composition is capable of flowing. Advantageously and according to the invention, said first starting composition and said second starting composition are liquid compositions fed continuously under liquid pressure, the liquid phase of each of these compositions being adapted so that their mixture forms said liquid medium of the reaction medium. Preferably, advantageously and according to the invention, the first starting composition and the second starting composition are both solutions formed in said liquid medium.

Advantageously and according to the invention, the first pipe portion and the second pipe portion join together upstream of the inlet of the solvothermal treatment zone—especially upstream of the inlet of the reaction pipe—in a third pipe portion connecting together each of the first and second pipe portions and the inlet of the solvothermal treatment zone, the precursor gel being formed (by co-precipitation) continuously in said third pipe portion. Advantageously and according to the invention, the reactor thus has a third pipe portion extending downstream of the first pipe portion and of the second pipe portion, said third pipe portion continuing up to an inlet of the reaction pipe. In other words, said third pipe portion forms an intermediate portion between, on the one hand, said first pipe portion, the second pipe portion and, on the other hand, the reaction pipe (in which is performed the solvothermal treatment of the reaction medium for obtaining phyllomineral particles, and in particular phyllosilicate particles). In this third pipe portion, each mineral compound and each metal salt are placed in contact to form the precursor gel by co-precipitation continuously.

Advantageously and according to the invention, the flow rate of the precursor gel composition in the third pipe portion and the length of the third pipe portion are suitable for allowing the continuous formation of the precursor gel upstream—especially immediately upstream—of the inlet into the reactor—especially of the reaction pipe—, i.e. before the solvothermal treatment. Preheating to a temperature above room temperature may optionally be envisaged in this third pipe portion, before the reaction pipe inlet.

Advantageously and according to the invention, the suspension comprising the phyllomineral particles, and in particular phyllosilicates, is cooled downstream of its exit from the solvothermal treatment zone.

Each pipe (or pipe portion) of the continuous synthesis device used for performing a process according to the invention has dimensions suitable for allowing continuous circulation of the various compositions (starting composition(s), reaction medium and suspension obtained comprising the phyllomineral synthetic particles). Each pipe and pipe portion may especially have centifluidic dimensions (inside diameter greater than 1 cm) or millifluidic dimensions (inside diameter greater than 1 mm) or microfluidic dimensions (inside diameter less than 1 mm and especially less than 750 µm). Advantageously and according to the invention, a reaction pipe with an inside diameter greater than 1 mm is used.

In addition, the continuous reactor may have additional inlets located before the solvothermal treatment zone, in the solvothermal treatment zone or alternatively after the outlet of the solvothermal treatment zone and before the outlet for the suspension obtained. Such inlets may allow the introduction of a gas or of a dense medium, for example a liquid (water or alcohol, for example, so as to control the proportion of liquid medium or alternatively to control the pH at any stage of the process) and/or a solid. They may also be, for example, compositions for grafting by means of at least one water-soluble oxysilane having the formula (III):

(III)

in which A denotes a group chosen from a methyl and hydrocarbon-based groups comprising at least one heteroatom; and R3, R4 and R5 are identical or different and are chosen from a hydrogen and linear alkyl groups comprising 1 to 3 carbon atoms.

Said oxysilane may be introduced, for example, before the solvothermal treatment zone and may be a trialkoxysilane that is soluble in aqueous medium and of the following formula:

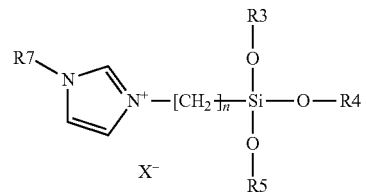

in which:
R3, R4 and R5 are identical or different and are chosen from linear alkyl groups comprising 1 to 3 carbon atoms,
R7 is chosen from linear alkyl groups comprising 1 to 18 carbon atoms,
n is an integer between 1 and 5, and X⁻ is an anion whose thermal stability is compatible with the temperature and the residence time of the solvothermal treatment, and, for example, an anion in which X is chosen from chlorine, iodine and bromine.

They may also be compositions for functionalisation of the phyllomineral synthetic particles, for example with magnetite particles, precipitation activators, catalysts for the precipitation reaction or for the transformation of at least one starting composition into a suspension comprising phyllomineral synthetic particles, or alternatively silver particles.

Advantageously and according to the invention, a suspension comprising particles of 2:1 phyllosilicate type is obtained. More particularly, advantageously and according to the invention, a suspension comprising phyllosilicate particles in accordance with formula (II) is obtained. In particular, the phyllosilicate particles obtained via a process according to the invention have, on x-ray diffraction, the following characteristics diffraction lines:
- a plane (001) located at a distance of between 9.40 Å and 12.50 Å;
- a plane (003) located at a distance of between 3.10 Å and 3.30 Å;
- a plane (060) located at a distance of between 1.51 Å and 1.53 Å.

More particularly, the phyllosilicate particles obtained via a process according to the invention have, on x-ray diffraction, the following characteristics diffraction lines:
- a plane (001) located at a distance of between 9.40 Å and 12.50 Å;
- a plane (002) located at a distance of between 4.60 Å and 5.00 Å;
- a plane (003) located at a distance of between 3.10 Å and 3.30 Å;
- a plane (060) located at a distance of between 1.51 Å and 1.53 Å.

Such phyllosilicate particles are obtained in particular when a precursor gel in accordance with the abovementioned formula (I) is used.

The suspension comprising phyllosilicate particles obtained via a process according to the invention may be dried via any powder drying technique. Advantageously and according to the invention, consecutive to said solvothermal treatment, said synthetic particles obtained are dried by lyophilisation. The drying may also be performed by means of an oven, for example at a temperature of between 60° C. and 130° C., for 1 hour to 48 hours, under microwave irradiation, or alternatively by atomisation.

The invention also relates to a process and a composition that may be obtained via a process according to the invention, characterised in combination by all or some of the characteristics mentioned above or below.

Figure 2:
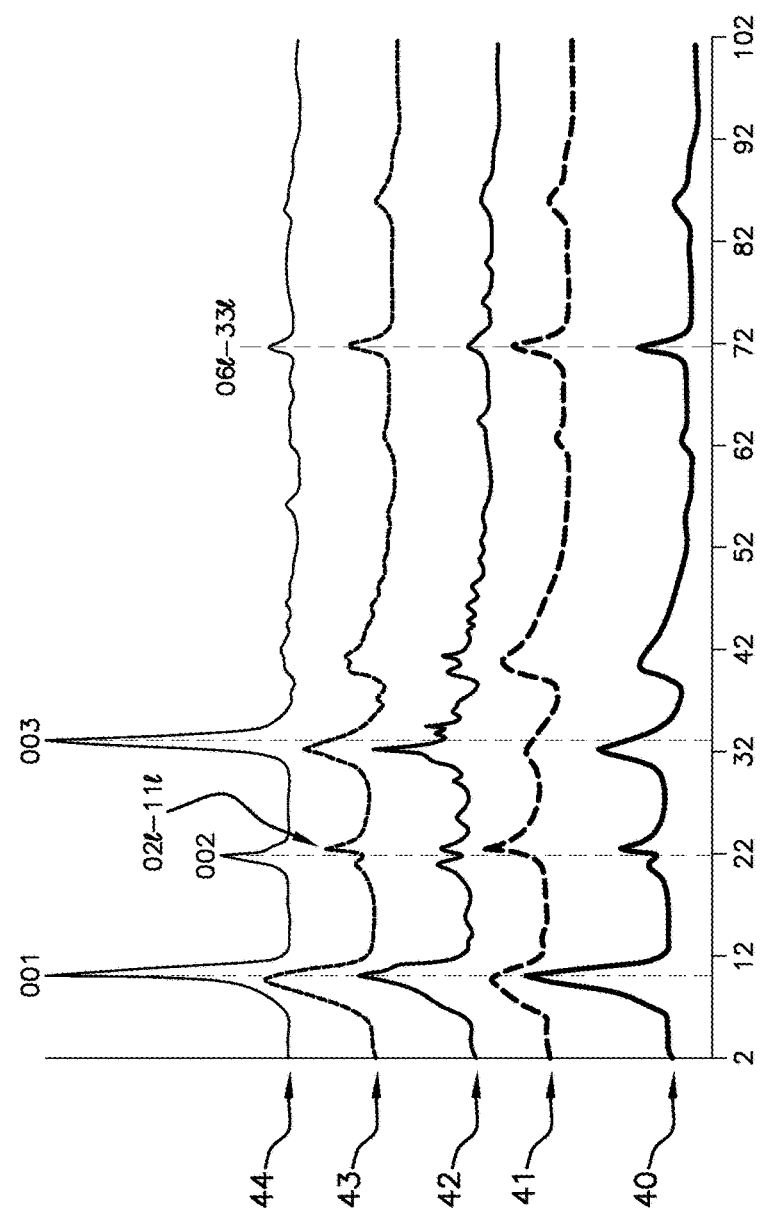
Figure 3:
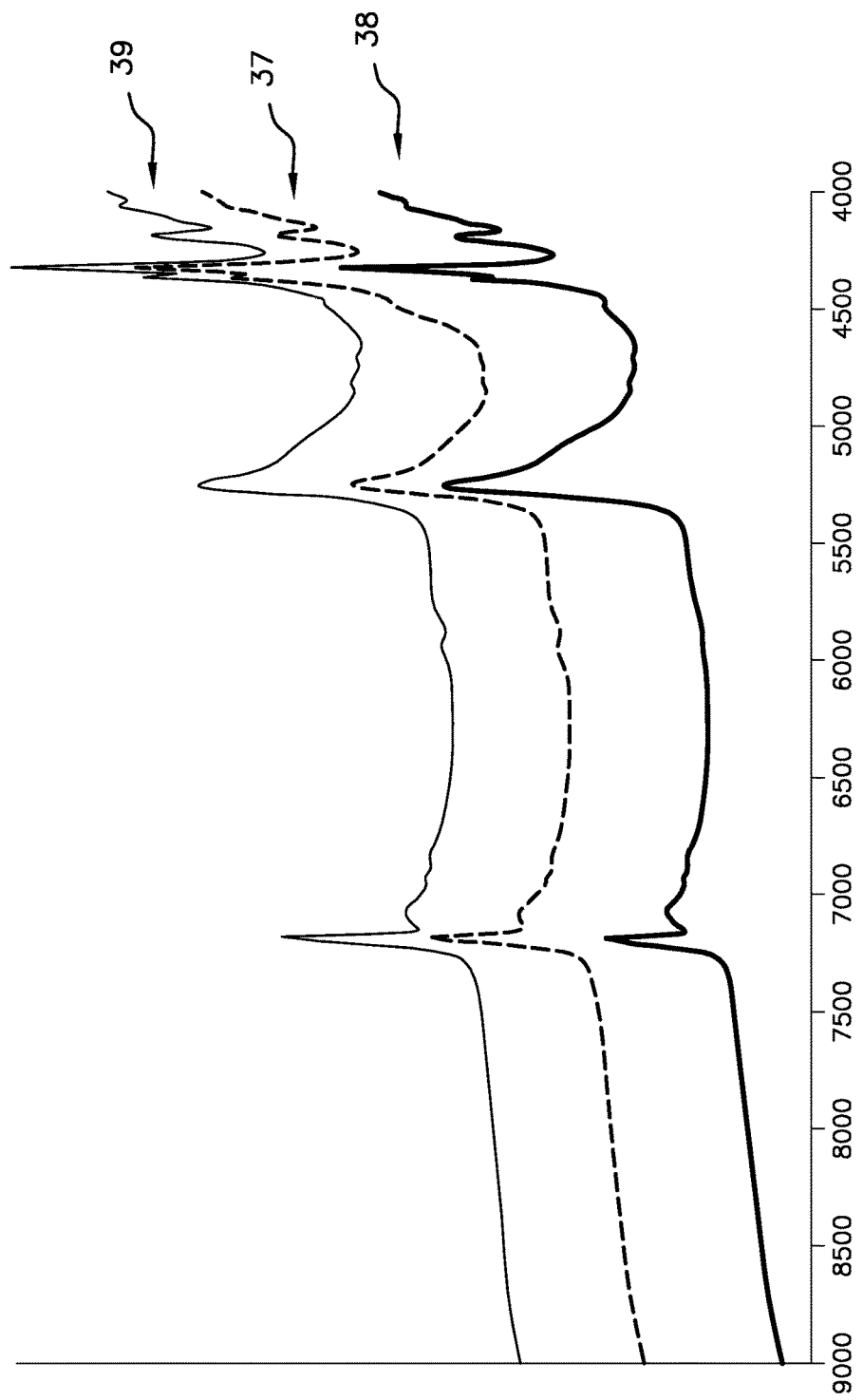
Figure 4:
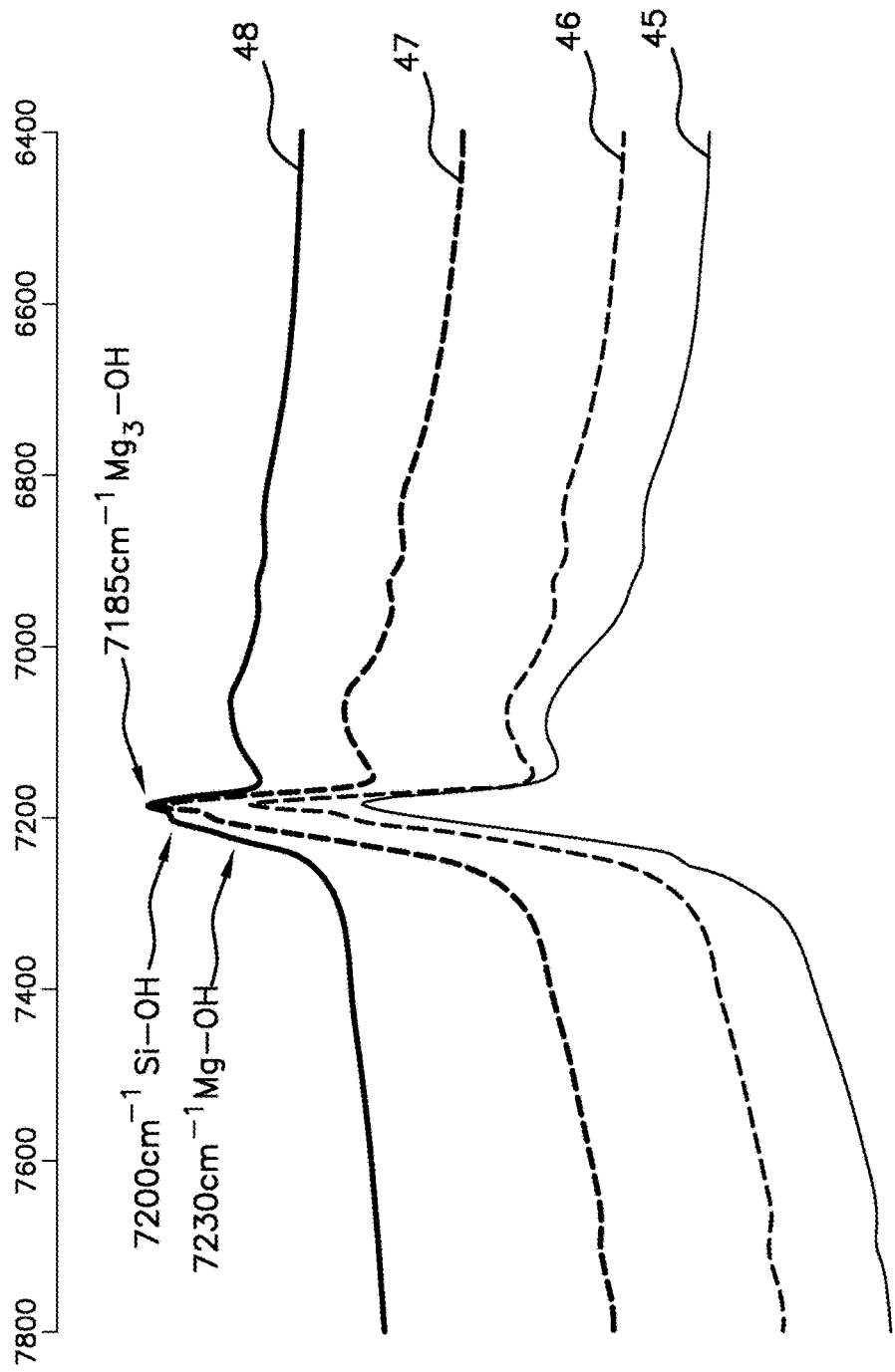
Figure 5:
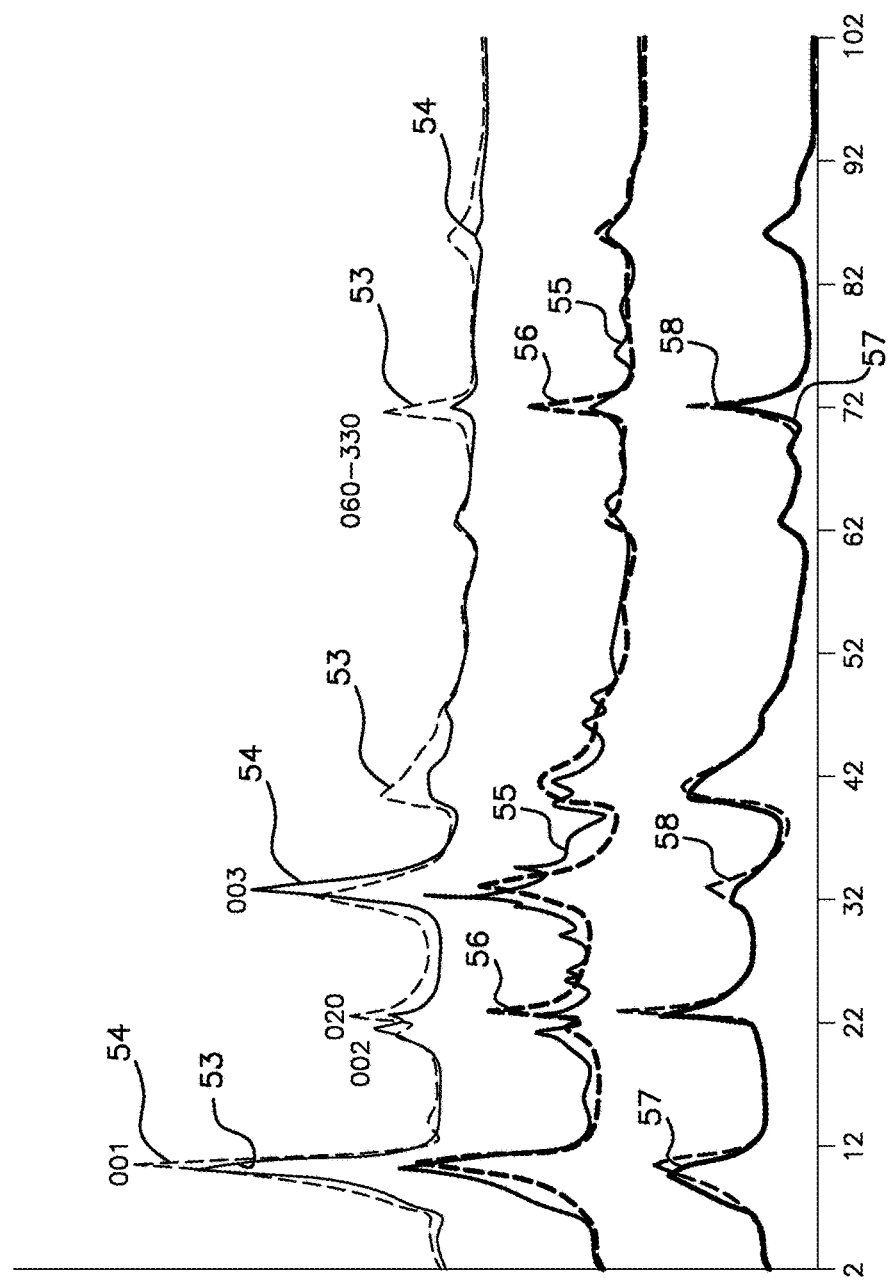
Figure 6:
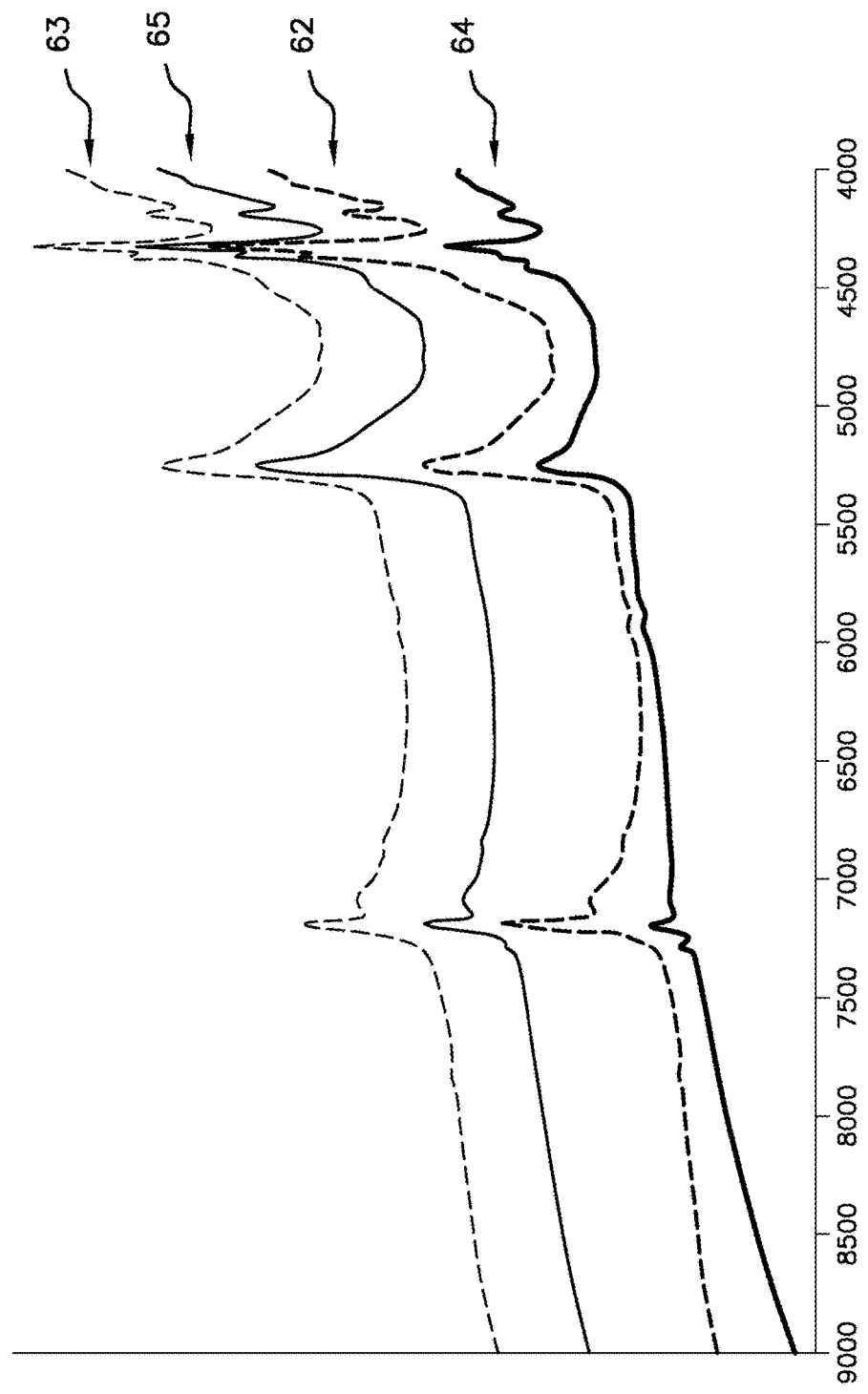
Figure 8:
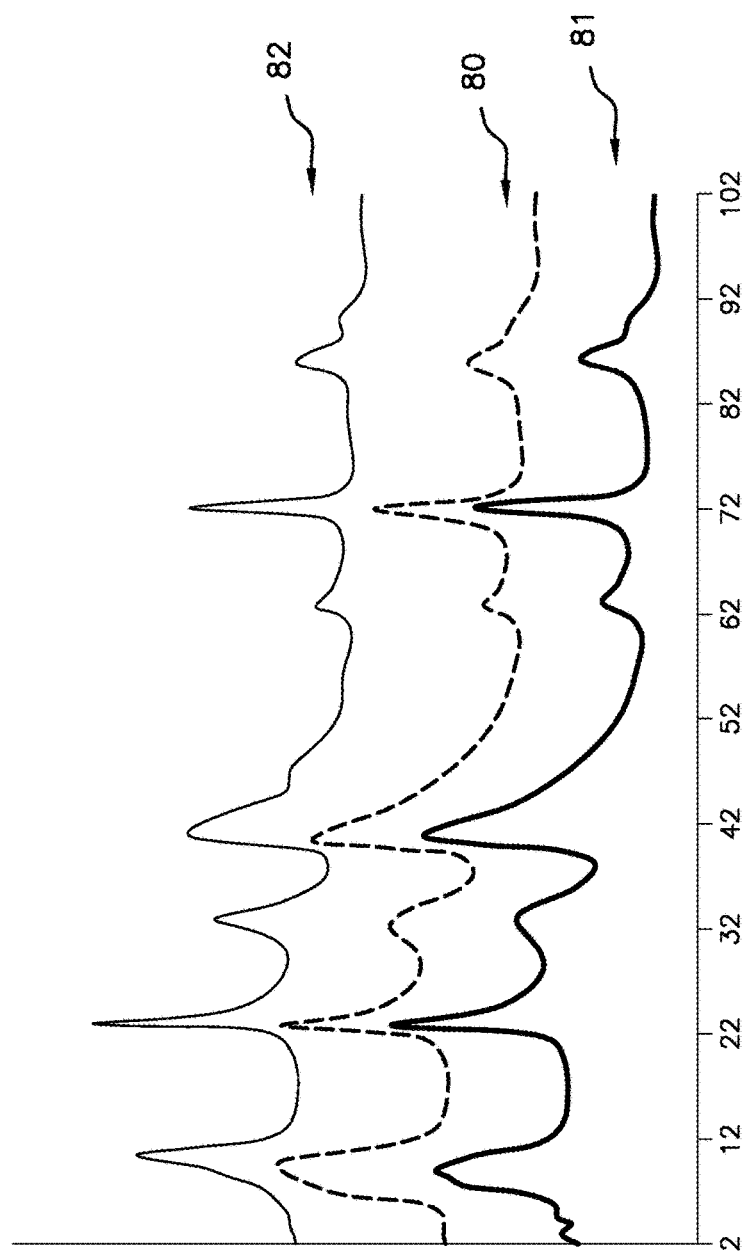
Figure 9:
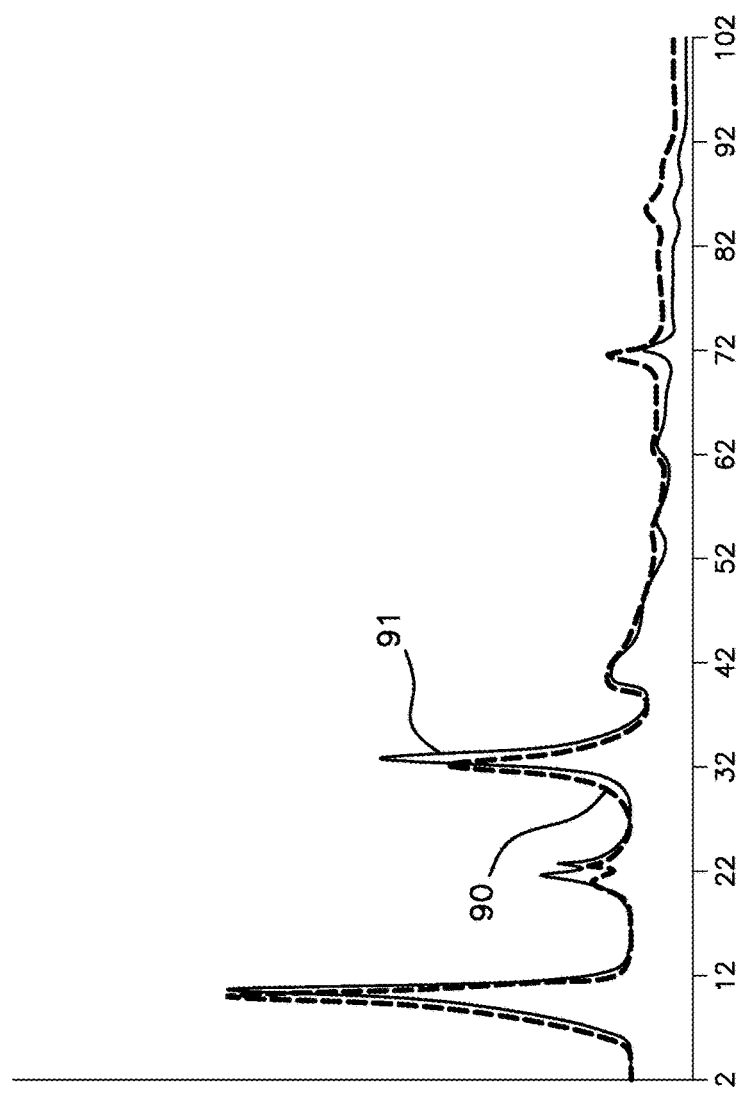
Figure 10:
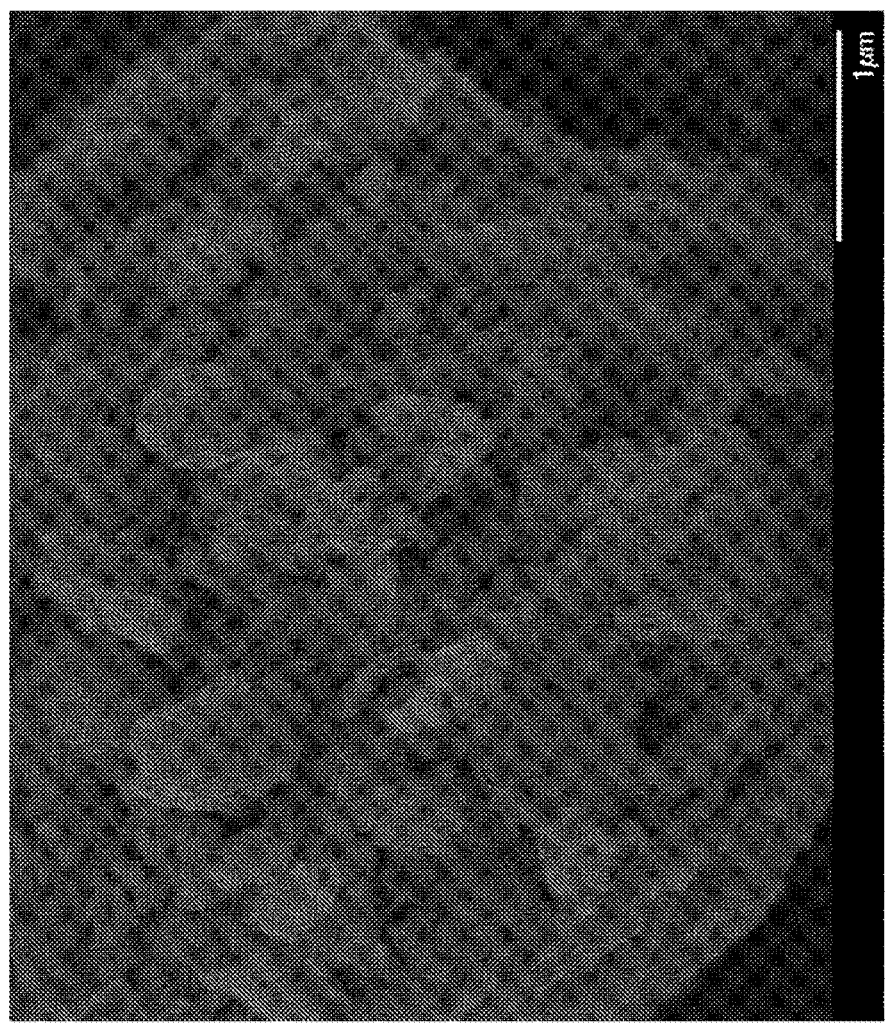
Figure 11:

Other aims, characteristics and advantages of the invention will emerge on reading the following description of one of the preferential embodiments thereof, which is given as a non-limiting example, and which refers to the attached figures, in which:

FIG. 1 is a schematic view of a device for preparing phyllomineral synthetic particles used in a process according to the invention, FIGS. 2, 5, 7, 8 and 9 represent x-ray (XR) diffractograms of phyllomineral particles obtained via the examples given below with a process according to the invention, FIGS. 3, 4 and 6 represent Fourier-transform infrared absorption spectra of phyllomineral synthetic particles obtained via the examples given below with a process according to the invention, FIGS. 10 and 11 are field-effect scanning electron microscopy photographs of phyllomineral synthetic particles obtained in an example given below with a process according to the invention.

A—General Protocol for Preparing Phyllomineral Synthetic Particles According to the Invention 1/—Device for Preparing Phyllomineral Synthetic Particles In a process according to the invention, a reactor 15 for continuously preparing phyllomineral synthetic particles (as illustrated in FIG. 1) is used, comprising:
- a first pipe portion 11 into which is introduced a first aqueous solution 20 comprising at least one mineral compound chosen from silicates, germanates, solid solutions thereof and mixtures thereof,
- a second pipe portion 12 into which is introduced a second aqueous solution 21 comprising at least one metal salt of at least one metal M,
- a third pipe portion 13 arranged after the first pipe portion 11 and the second pipe portion 12 and continuing up to an inlet 9 of a reaction chamber 16, the first pipe portion 11 and the second pipe portion 12 joining together at a point 17 from which the third pipe portion 13 begins,
- a reaction pipe 14 extending from the inlet 9 into the reaction chamber 16, and after the third pipe portion 13.

A peristaltic pump 18 allows the first pipe portion 11 to be continuously fed under pressure with the first aqueous solution 20 contained in a stirred tank 30. A second peristaltic pump 19 allows the second pipe portion 12 to be continuously fed under pressure with the second aqueous solution 21 contained in a stirred tank 31.

For the purposes of controlling the temperature inside the reaction pipe 14, the reaction chamber 16 is an oven comprising a heating sleeve comprising resistors made of ceramic material. The reaction pipe 14 is in the general form of a coil wound into multiple spires inside the heating sleeve, until it exits therefrom via an outlet 8 constituting the outlet of the reaction chamber 16.

A co-precipitation reaction of a precursor gel of phyllomineral particles takes place in the third pipe portion 13, upstream of the inlet 9, i.e. before the solvothermal treatment. The temperature of the precursor gel composition in the third pipe portion 13 is close to room temperature. The length of the third pipe portion 13 may be surprisingly short, of the order of a few centimetres, and is, for example, between 10 cm and 20 cm. In the examples, this length is about 15 cm. The residence time in the third pipe portion 13 (i.e. between point 17 and the inlet 9 of the reaction chamber 16) is also very short and may be less than 5 minutes, especially less than 1 minute or even less than 30 seconds. The total time for preparing phyllomineral synthetic particles via a process according to the invention is thus less than 15 minutes, and in particular less than 10 minutes or even less than 5 minutes or about 1 minute.

In addition, it is possible to introduce other solutions such as particle grafting or functionalisation solutions or to add a solvent in different points of the device, for example at inlets 4, 5 located before the solvothermal treatment zone, at an inlet 6 located in the solvothermal treatment zone or alternatively at an inlet 7 located after the solvothermal treatment zone and before the outlet for the suspension obtained.

A pressure regulator 2 is placed downstream of the reaction chamber 16 in connection with a fifth pipe portion 10 extending from the outlet 8 of the reaction pipe 14 and of the reaction chamber 16 up to a container 25 in which is recovered a suspension comprising the phyllomineral synthetic particles obtained.

Closure of a valve 32 positioned on the fifth pipe portion 10 makes it possible to circulate the suspension obtained at the outlet 8 of the reaction pipe 14 in a branch circuit 33 for passing this suspension through a porous sinter 34 suitable for retaining the particles and allowing their recovery. The porous sinter 34 is immersed in an ice tank 35 for cooling the suspension exiting the reactor. In this case, valves 36 and 37 located on the branch circuit 33 are opened. The porous sinter 34 is chosen so as to retain the phyllomineral particles synthesised by separating them from the liquid medium which transports them. The sinter is made, for example, of 316L stainless steel, with a porosity size of 50 μm. When the porous sinter 34 is clogged with phyllomineral particles, it suffices to open valve 32 and to close valves 36 and 37 in order directly to recover the suspension in container 25, this suspension being cooled by passing through the ice tank 35, and then washed and centrifuged several times to recover the phyllomineral particles, which may then be dried, for example in an oven. In another variant (not shown), it is of course also possible to provide several sinters in parallel, which makes it possible to direct the suspension obtained at the outlet of the reaction pipe 14 to another sinter as soon as the preceding one is clogged with phyllomineral particles.

2/—Preparation of a Silico/Germano-Metallic Precursor Gel

The silico/germano-metallic gel may be prepared via a co-precipitation reaction involving, as reagent, at least one mineral compound comprising silicon and/or germanium, at least one dicarboxylate salt of formula $M(R_1—COO)_2$ (M denoting at least one divalent or trivalent metal and $R_1$ being chosen from H and alkyl groups comprising less than 5 carbon atoms) in the presence of at least one carboxylate salt of formula $R_2COOM'$ in which M' denotes a metal chosen from the group formed by Na and K, and $R_2$ is chosen from H and alkyl groups comprising less than 5 carbon atoms.

This co-precipitation reaction makes it possible to obtain a hydrated silico/germano-metallic hydrogel having the stoichiometry of talc (4 Si/Ge per 3 M, M having the formula $Mg_{y(1)}Co_{y(2)}Zn_{y(3)}Cu_{y(4)}Mn_{y(5)}Fe_{y(6)}Ni_{y(7)}Cr_{y(8)}$; each y(i) representing a real number of the interval [0; 1], and such that $$\sum_{i=1}^{8} y(i) = 1,$$

The silico/germano-metallic gel is prepared via a co-precipitation reaction performed using:

1. an aqueous solution of sodium metasilicate pentahydrate or an aqueous solution of sodium metagermanate, or a mixture of these two solutions in molar proportions x/(1-x), 2. a solution of dicarboxylate salt(s), prepared with one or more dicarboxylate salts of formula $M(R_1—COO)_2$ diluted in a carboxylic acid, such as acetic acid, and 3. a solution of carboxylate salt(s), prepared with one or more carboxylate salts of formula $R_2—COOM'$ diluted in distilled water.

The preparation of this silico/germano-metallic hydrogel is performed according to the following protocol:

1. the solutions of sodium metasilicate and/or metagermanate and of carboxylate salt(s) of formula $R_2—COOM'$ are mixed, 2. the solution of dicarboxylate salt(s) of formula $M(R_1—COO)_2$ is rapidly added thereto; the co-precipitation hydrogel forms instantaneously.

In addition, it is possible to subject the medium for preparing said hydrogel to ultrasound.

On conclusion of this precipitation, a silico/germano-metallic hydrogel is obtained, comprising:
  4 ($Si_xGe_{1-x}$),
  3 atoms of at least one metal M, M denoting at least one divalent metal having the formula $Mg_{y(1)}Co_{y(2)}Zn_{y(3)}Cu_{y(4)}Mn_{y(5)}Fe_{y(6)}Ni_{y(7)}Cr_{y(8)}$ in which each y(i) represents a real number of the interval [0; 1], and such that $$\sum_{i=1}^{8} y(i) = 1,$$

(10−ε) oxygen atoms ((10−ε) O), ε being a real number of the interval [0; 10],
  (2+ε) hydroxyl groups ((2+ε) (OH)), ε being a real number of the interval [0; 10],
  in an aqueous solution of carboxylate salt(s), said hydrogel being highly hydrated (water molecules being bound to the hydrogel particles without this being water of constitution) and having a more or less gelatinous consistency.

The hydrogel may also be recovered after centrifugation (for example between 3000 and 15 000 rpm, for 5 to 60 minutes) and removal of the supernatant (solution of carboxylate salt(s)), optionally washing with demineralised water (for example two successive washes and centrifugations) followed by drying, for example in an oven (60° C., 2 days), by lyophilisation, drying by atomisation or alternatively drying under microwave irradiation. The silico/germano-metallic particles of formula (I) below:

4 ($Si_xGe_{1-x}$) 3 M ((10−ε) O) ((2+ε) (OH))

may thus be stored in the form of a powder (in the presence or absence of the carboxylate salt(s) depending on whether or not washing with water has been performed) for the purpose of an optional subsequent hydrothermal treatment.

The precursor gel may be prepared continuously as envisaged in the phyllomineral particle preparation device described above, or, on the contrary, beforehand, i.e. outside the phyllomineral particle preparation device described above, and may then be introduced continuously, depending on the need, directly into the third pipe portion 13 or directly into the inlet 9 of the reaction pipe 14.

In each case, it is important to control the dilution of the precursor gel introduced into each pipe portion and in the reaction pipe 14 so as to allow continuous circulation of the reaction medium in the reaction pipe 14, and in all of the pipes for conveying said precursor gel composition up to the inlet 9 of the reaction chamber 16. The concentration of precursor hydrogel in said precursor gel composition introduced into the inlet of the reaction chamber 16 is advantageously between $10^{-3}$ mol/L and several mol/L, for example about 0.01 mol/L. It should be noted that this concentration is much lower than the concentrations used in the processes for preparing phyllomineral synthetic particles such as phyllosilicates of the prior art.

3/—Hydrothermal Treatment of Said Silico/Germano-metallic Hydrogel

The abovementioned optionally dried precursor hydrogel of formula (I), as obtained previously, is subjected to a hydrothermal treatment in the reaction pipe 14 when it enters the reaction chamber 16.

The hydrothermal treatment is a solvothermal treatment which may be performed in particular under supercritical or subcritical conditions, and in particular homogeneous subcritical conditions. Thus, the temperature and pressure at which this solvothermal treatment is performed may be chosen so that the precursor gel composition introduced into the reactor inlet, and in particular the solvent(s) it comprises, is (are) under supercritical conditions or under homogeneous subcritical conditions, i.e. above the liquid-gas equilibrium curve of the solvent, and so that the solvent is in liquid form and not in the form of a liquid-gas mixture, or of gas alone.

On conclusion of this hydrothermal treatment, a suspension is obtained comprising phyllosilicate mineral particles in an aqueous solution of carboxylate salt(s). At the end of this hydrothermal treatment, the suspension obtained is recovered by filtration, for example using a ceramic sinter, or alternatively by centrifugation (between 3000 and 15 000 rpm, for 5 to 60 minutes), followed by removal of the supernatant. The supernatant solution contains one or more salts of formula $R_1$—COOM' and/or $R_2$—COOM' and may be kept for the purpose of recovering this (these) carboxylate salt(s) and recycling it (them).

The composition recovered comprising mineral particles may optionally be washed with water, in particular with distilled or osmosed water, by performing, for example, one or two washing/centrifugation cycles.

The composition comprising mineral particles recovered after the final centrifugation may then be dried:
in an oven at a temperature of between 60° C. and 130° C., for 1 to 24 hours, or alternatively
by lyophilisation, for example in a lyophiliser of CHRIST ALPHA® 1-2 LD Plus type, for 48 hours to 72 hours,
by microwave irradiation,
by atomisation,
or alternatively via any powder-drying technique.

A divided solid composition whose colour depends on the nature of the dicarboxylate salt(s) of formula $M(R_1$—$COO)_2$ used for the preparation of the silico/germano-metallic gel (and also, where appropriate, on the respective proportions of this (these) dicarboxylate salt(s)) is finally obtained.

The inventors have thus been able to note not only that an extremely short time (less than 1 minute) of hydrothermal treatment under supercritical conditions is sufficient to allow conversion of the initial gel into a heat-stable crystalline material, but also that the synthetic mineral particles obtained have improved crystallinity.

The phyllosilicate mineral particles contained in a talc composition obtained via a process according to the invention have noteworthy properties in terms of purity, crystallinity and thermal stability, and this being so for a hydrothermal treatment time that is extremely short (relative to the hydrothermal treatment time previously necessary in a known process for preparing a talc composition), and without the need for a subsequent anhydrous heat treatment (annealing).

B/—Analysis and Structural Characterisation

The results of analysis of a talc composition obtained by following the protocol described previously are reported below. These results confirm that the invention effectively makes it possible to arrive at the formation of synthetic phyllosilicate mineral particles having structural characteristics (especially lamellarity and crystallinity) that are very similar to those of natural talcs. They also show that, especially by means of the choice of the temperature and time used, the invention makes it possible to synthesise, in an extremely simple manner, stable and pure synthetic silico/germano-metallic mineral particles, with defined and predictable crystalline characteristics and size.

The analyses were especially performed by x-ray diffraction, infrared and by electron microscopy observations. The data collected are presented in the attached figures and in the examples, and are commented below.

1/—X-Ray Diffraction Analyses

On x-ray (XR) diffraction, a natural talc such as a talc originating from the ARNOLD mine (New York State, USA), is known to have the following characteristic diffraction lines (from the publication by Ross M., Smith W. L. and Ashton W. H., 1968, "*Triclinic talc and associated amphiboles from Gouverneur mining district, New York; American Mineralogist*", volume 53, pages 751-769):
for plane (001), a line located at a distance of 9.34 Å;
for plane (002), a line located at a distance of 4.68 Å;
for plane (020), a line located at a distance of 4.56 Å;
for plane (003), a line located at a distance of 3.115 Å;
for plane (060), a line located at a distance of 1.52 Å.

FIGS. 2, 5, 7, 8 and 9 show XR diffractograms of the particles obtained in the examples below, each of which representing the relative intensity of the signal (number of counts per second) as a function of the diffraction angle 2θ.

The XR diffractograms represented were recorded on a CPS 120 machine sold by the company INEL (Artenay, France). It is a curved-detector diffractometer allowing real-time detection over an angular range of 120°. The acceleration voltage used is 40 kV and the current is 25 mA. The Bragg relationship giving the structural equidistance is: $d_{hkl}$=0.89449/sin θ (with the use of a cobalt anticathode).

This x-ray diffraction analysis confirms that there is great structural similarity between the phyllosilicate mineral particles of the talc compositions prepared in accordance with the invention and the natural talc particles.

In particular, the diffraction lines which correspond, respectively, to the planes (003) and (060) have positions that coincide perfectly with those of the reference diffraction lines for natural talc.

2/—Near-infrared Analyses

On infrared, it is known that natural talc has, in near-infrared, a vibration band at 7185 $cm^{-1}$ representative of vibration of the $Mg_3$—OH bond.

The spectra presented in FIGS. 3, 4 and 6 were acquired using a NICOLET 6700-FTIR spectrometer over a range from 9000 $cm^{-1}$ to 4000 $cm^{-1}$.

3/—Microscope Observations and Assessment of the Particle Size of the Particles

Given the great fineness of the powders that may constitute the talc compositions in accordance with the invention, the size and particle size distribution of the phyllosilicate mineral particles of which they are composed were assessed by field-effect scanning electron microscopy and transmission electron microscopy observation.

The examples that follow illustrate the preparation process according to the invention and the structural characteristics of compositions comprising the synthetic mineral particles, and in particular of the talc compositions comprising phyllosilicate mineral particles, thus obtained.

EXAMPLE 1

A magnesium acetate solution is first prepared by adding 1.60817 g of magnesium acetate tetrahydrate (Mg $(CH_3COO)_2.4H_2O$) to 5 mL of acetic acid $CH_3COOH$ at 1 mol/L and 245 mL of distilled water.

Separately, a sodium metasilicate solution is prepared by adding 2.12136 g of sodium metasilicate pentahydrate ($Na_2OSiO_2.5H_2O$) to 250 mL of distilled water.

The peristaltic pumps 18, 19 convey the two solutions separately via steel pipes with an outside diameter of ⅛ inch (3.175 mm) and an inside diameter of 1.57 mm, and at a flow rate of 2 mL/min each, i.e. a total flow rate of 4 mL/min at point 17 where the mixing of the two solutions takes place continuously, a few centimetres before the inlet 9 of the reaction pipe 14. The temperature in the chamber 16 is 400° C., and the pressure in the reaction pipe 14 is maintained (by means of the pressure regulator 2) above 22.1 MPa (between 25 MPa and 27 MPa), so that the reaction medium which circulates in the reaction pipe 14 in the chamber 16 is under conditions above the critical point of water (374° C., 221 bar).

The precursor gel, derived from the mixing and co-precipitation of the two solutions taking place in the third pipe portion 13 upstream of the inlet 9 of the reaction pipe 14, thus undergoes a hydrothermal treatment in the reaction chamber 16, which makes it possible to transform this precursor gel into a suspension of synthetic talc. The residence time in the reaction pipe 14 between the inlet 9 and the outlet 8 is 23 seconds.

After cooling, the suspension obtained from the outlet 8 of the reactor 15 is a colloidal suspension of synthetic talc particles in saline aqueous medium (sodium acetate). It has the appearance of a milky white composition which settles over several tens of minutes. This suspension is subjected to a centrifugation cycle (10 min at 8000 rpm). After centrifugation, a talc composition, on the one hand, and a supernatant solution especially comprising sodium acetate, on the other hand, the latter then being able to be recovered and optionally recycled, are recovered.

The recovered talc composition is then subjected to two successive cycles of washing with demineralised water and centrifugation (10 min at 8000 rpm).

The recovered talc composition after centrifugation is finally dried in an oven at 60° C. for 12 hours.

The XR diffractogram of the talc particles obtained according to the invention is represented by curve 40 in FIG. 2. The XR diffractogram of this talc composition shows diffraction lines corresponding to the diffraction lines of talc, and in particular the following characteristic diffraction lines:
 a plane (001) located at a distance of 10.05 Å;
 a plane (002) located at a distance of 4.96 Å;
 a plane (020) located at a distance of 4.59 Å;
 a plane (003) located at a distance of 3.19 Å;
 a plane (060) located at a distance of 1.53 Å.

Curve 40 is similar to that obtained via the process of WO 2013/004979 at 300° C. but with a hydrothermal treatment of 3 hours. Curve 44 in FIG. 2 is a comparative diffractogram of the talc particles obtained via the process of WO 2013/004979 at 300° C. with a hydrothermal treatment of 6 hours, which are considered as a reference.

It is furthermore noted that by repeating this example several times, virtually identical diffractograms are obtained, demonstrating the excellent reproducibility of the process according to the invention.

FIG. 3 represents the infrared absorption spectra of the particles obtained according to the invention in this example 1 (curve 37), comparing them with the infrared absorption spectrum of the talc particles obtained via the process of WO 2013/004979 at 300° C. with a hydrothermal treatment of 1 hour (curve 38) and with the infrared absorption spectrum of the talc particles obtained via the process of WO 2013/004979 at 300° C. with a hydrothermal treatment of 2 hours (curve 39).

FIG. 4 represents the infrared absorption spectra of the particles obtained according to the invention in this example 1 according to the invention in 23 s (curve 45), and of talc particles obtained via the process of WO 2013/004979 at 300° C. with a hydrothermal treatment of 3 hours (curve 46); of talc particles obtained via the process of WO 2013/004979 at 300° C. with a hydrothermal treatment of 2 hours (curve 47); of talc particles obtained via the process of WO 2013/004979 at 300° C. with a hydrothermal treatment of 1 hour (curve 48).

FIGS. 10 and 11 are photographs taken with a field-effect scanning electron microscope (FE SEM) illustrating phyllosilicate particles obtained in this example. Submicron talc particles are obtained (which are visible in the photographs of FIGS. 10 and 11 in a form in which the particles are agglomerated together) having a largest dimension of the order of 200 Å to 3000 Å, a thickness of less than 100 Å corresponding to a few stacked sheets.

EXAMPLE 2

A magnesium acetate solution is first prepared by adding 3.216 g of magnesium acetate tetrahydrate ($Mg(CH_3COO)_2.4H_2O$) to 10 mL of acetic acid $CH_3COOH$ at 1 mol/L and 490 mL of distilled water.

Separately, a sodium metasilicate solution is prepared by adding 4.24284 g of sodium metasilicate pentahydrate ($Na_2OSiO_2.5H_2O$) to 500 mL of distilled water.

In this example, the two solutions 20, 21 are fed by the pumps 18, 19 at a flow rate of 4 mL/min each, i.e. a total flow rate of 8 mL/min of reaction medium in the reaction pipe 14. The residence time in the reactor (in the reaction pipe 14 between the inlet 9 and the outlet 8) is 11 seconds. The other reaction conditions are identical to those of example 1.

The XR diffractogram of the talc particles obtained is represented by curve 41 in FIG. 2. The XR diffractogram of this talc composition shows diffraction lines corresponding to the diffraction lines of talc, and in particular the following characteristic diffraction lines:
 a plane (001) located at a distance of 10.47 Å;
 a plane (020) located at a distance of 4.57 Å;
 a plane (003) located at a distance of 3.19 Å;
 a plane (060) located at a distance of 1.53 Å.

Curve 41 is similar to that obtained via the process of WO 2013/004979 at 300° C. but with a hydrothermal treatment of 1 hour.

EXAMPLE 3

A magnesium acetate solution is first prepared by adding 3.2165 g of magnesium acetate tetrahydrate ($Mg(CH_3COO)_2.4H_2O$) to 10 mL of acetic acid $CH_3COOH$ at 1 mol/L and 490 mL of distilled water.

Separately, a sodium metasilicate solution is prepared by adding 4.24325 g of sodium metasilicate pentahydrate ($Na_2OSiO_2.5H_2O$) to 500 mL of distilled water.

The reaction conditions are identical to those of example 1.

The ceramic sinter 34 is used at the outlet so as to separate out the talc particles by filtering the suspension. The particles are recovered manually from the sinter (without washing or centrifugation) and then dried in an oven. Separately, the saline solution may be recovered at the sinter outlet and then dried to recover the salt.

When the sinter 34 is filled with talc particles, the remainder of the synthesised product may be recovered in container 25, without passing through the sinter. This portion of the product is centrifuged, and then washed/centrifuged twice. The talc composition then recovered is subsequently dried in an oven.

The XR diffractograms of the talc particles obtained in this example 3 are represented by curves 42 and 43 in FIG. 2. Curve 42 is obtained with the particles recovered by the sinter. Curve 43 is obtained by the particles recovered by washing and centrifugation without the sinter.

The XR diffractogram of the talc composition represented by curve 42 shows diffraction lines corresponding to the diffraction lines of talc, and in particular the following characteristic diffraction lines:
- a plane (001) located at a distance of 10.08 Å;
- a plane (002) located at a distance of 4.90 Å;
- a plane (020) located at a distance of 4.53 Å;
- a plane (003) located at a distance of 3.20 Å;
- a plane (060) located at a distance of 1.52 Å.

The XR diffractogram of the talc composition represented by curve 43 shows diffraction lines corresponding to the diffraction lines of talc, and in particular the following characteristic diffraction lines:
- a plane (001) located at a distance of 10.54 Å;
- a plane (002) located at a distance of 4.91 Å;
- a plane (020) located at a distance of 4.56 Å;
- a plane (003) located at a distance of 3.19 Å;
- a plane (060) located at a distance of 1.52 Å.

Curves 42 and 43 are similar to that obtained via the process of WO 2013/004979 at 300° C. but with a hydrothermal treatment of 2 hours.

FIG. 5 compares the XR diffractograms of the particles obtained in example 1 according to the invention in 23 s (curve 53), and of talc particles obtained via the process of WO 2013/004979 at 300° C. with a hydrothermal treatment of 3 hours (curve 54); of particles obtained on the sinter in example 3 according to the invention in 23 s (curve 55) and of talc particles obtained via the process of WO 2013/004979 at 300° C. with a hydrothermal treatment of 2 hours (curve 56); of particles obtained in example 2 according to the invention in 11 s (curve 57) and of talc particles obtained via the process of WO 2013/004979 at 300° C. with a hydrothermal treatment of 1 hour (curve 58).

FIG. 6 compares infrared absorption spectra of particles obtained according to the invention in example 1 (curve 62), in example 2 (curve 63) and in example 3 (curve 64 for those obtained from the sinter; curve 65 for those obtained without the sinter).

EXAMPLE 4

A magnesium acetate solution is first prepared by adding 3.2165 g of magnesium acetate tetrahydrate (Mg($CH_3$COO)$_2$.4H$_2$O) to 10 mL of acetic acid $CH_3COOH$ at 1 mol/L and 490 mL of distilled water.

Separately, a sodium metasilicate solution is prepared by adding 4.24325 g of sodium metasilicate pentahydrate (Na$_2$OSiO$_2$.5H$_2$O) to 500 mL of distilled water.

Three successive tests are performed under reaction conditions identical to those of example 1, by varying the temperature of the hydrothermal treatment and the flow rates according to the following table:

| Test | 1 | 2 | 3 |
| --- | --- | --- | --- |
| Temperature (° C.) | 350 | 375 | 400 |
| Flow rate of each salt (mL/min) | 7.5 | 6 | 2 |
| Total flow rate (mL/min) | 15 | 12 | 4 |
| Curve | 72 | 73 | 74 |

Figure 7:
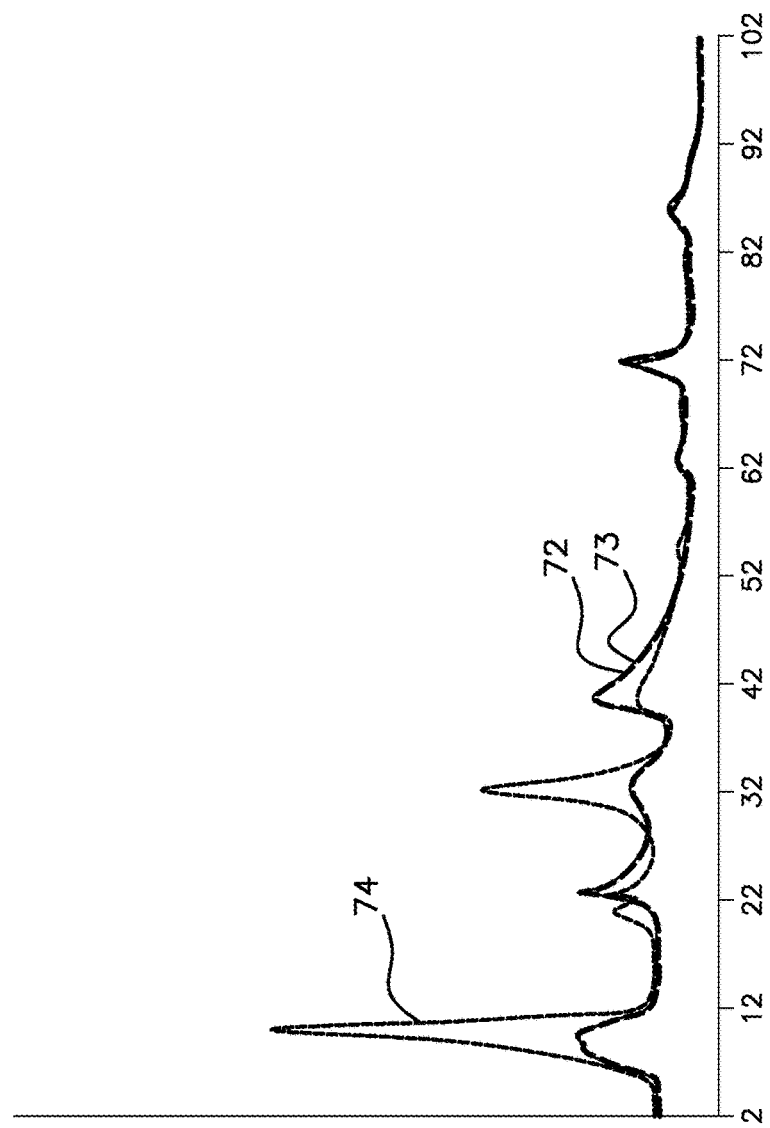

The XR diffractograms of the phyllosilicate particles obtained are represented by curves 72, 73 and 74, respectively, in FIG. 7. Curve 72 corresponds to the temperature of 350° C., curve 73 corresponds to the temperature of 375° C. and curve 74 corresponds to the temperature of 400° C. (similar to that of example 1). Curves 72 and 73 are virtually identical. As may be seen, a process according to the invention also makes it possible to obtain phyllosilicate particles having the structure of a talc under homogeneous subcritical conditions. In addition, under supercritical conditions, the structural characteristics of the particles are even better and, as may be seen by means of curve 74, the crystallinity of the particles obtained under these conditions is exceptional and similar to that of a natural talc.

The XR diffractogram of the talc composition represented by curve 72 shows diffraction lines corresponding to the diffraction lines of talc, and in particular the following characteristic diffraction lines:
- a plane (001) located at a distance of 12.09 Å;
- a plane (020) located at a distance of 4.57 Å;
- a plane (003) located at a distance of 3.25 Å;
- a plane (060) located at a distance of 1.53 Å.

The XR diffractogram of the talc composition represented by curve 73 shows diffraction lines corresponding to the diffraction lines of talc, and in particular the following characteristic diffraction lines:
- a plane (001) located at a distance of 11.96 Å;
- a plane (020) located at a distance of 4.55 Å;
- a plane (003) located at a distance of 3.25 Å;
- a plane (060) located at a distance of 1.53 Å.

The XR diffractogram of the talc composition represented by curve 74 shows diffraction lines corresponding to the diffraction lines of talc, and in particular the following characteristic diffraction lines:
- a plane (001) located at a distance of 10.21 Å;
- a plane (002) located at a distance of 4.98 Å;
- a plane (020) located at a distance of 4.61 Å;
- a plane (003) located at a distance of 3.22 Å;
- a plane (060) located at a distance of 1.53 Å.

FIG. 8 compares the XR diffractograms of the particles obtained in test 2 (at 375° C.) according to the invention (curve 80), and of talc particles obtained according to the protocol described by WO 2013/004979 at 230° C. with a hydrothermal treatment of 6 hours (curve 81), and of talc particles obtained via the process of WO 2013/004979 at 300° C. with a hydrothermal treatment of 1 hour (curve 82).

FIG. 9 compares the XR diffractograms of the particles obtained in test 3 (at 400° C.) according to the invention (curve 90), and of talc particles obtained via the process of WO 2013/004979 at 300° C. with a hydrothermal treatment of 3 hours (curve 91).

It is found that the mean size of the elementary particles obtained in the above examples is generally less than 3000 Å. The particle size may, of course, vary as a function especially of the residence time and of the temperature in the hydrothermal treatment zone, an increase in the residence time allowing, for example, an increase in the particle size essentially in the (a, b) plane of the crystal lattice of the particles (i.e. width and length of the particles).

The above examples also show that it is easy to precisely adjust the structural characteristics of the phyllosilicate particles obtained by modifying the residence time, i.e. the duration of the solvothermal treatment, and/or the temperature of the solvothermal treatment.

The invention may form the subject of numerous embodiment variants. In particular, it is possible to envisage several main pipes arranged in parallel in the same reactor; it is possible to prepare the precursor gel (or particles corresponding to this precursor gel) beforehand in order to be able to use it as need be to perform the solvothermal treatment; the device for continuously applying the temperature and pressure of the solvothermal treatment to the reaction medium initially constituted by the precursor gel may form the subject of different embodiment variants, etc.

The invention claimed is:

1. A process for preparing phyllomineral synthetic particles formed from chemical elements, named constituent chemical elements, in predetermined proportions, named stoichiometric proportions, said constituent chemical elements comprising at least one chemical element selected from the group consisting of silicon and germanium, and at least one chemical element selected from the group consisting of divalent metals and trivalent metals, via a solvothermal treatment of a reaction medium comprising a liquid medium and containing said stoichiometric proportions of said constituent chemical elements of said phyllomineral synthetic particles, said phyllomineral synthetic particles belonging to the group of non-swelling phyllosilicates, in which:
said solvothermal treatment is performed continuously at a pressure greater than 1 MPa and at a temperature of between 100° C. and 600° C.,
the reaction medium is continuously circulated in a solvothermal treatment zone of a continuous reactor with a residence time of the reaction medium in said solvothermal treatment zone that is suitable for continuously obtaining, at the outlet of said solvothermal treatment zone, a suspension comprising said phyllomineral synthetic particles.

2. The process according to claim 1, wherein a constant-volume continuous reactor is used.

3. The process according to claim 1, wherein the solvothermal treatment zone of the reactor comprises at least one pipe, named the reaction pipe, in which the reaction medium continuously circulates between at least one inlet suitable for allowing the continuous introduction of at least one starting composition and at least one outlet via which the suspension comprising said phyllomineral synthetic particles is continuously recovered.

4. The process according to claim 3, wherein the temperature is controlled by controlling the temperature of the reaction pipe.

5. The process according to claim 1, wherein said solvothermal treatment is performed at a pressure of between 2 MPa and 50 MPa.

6. The process according to claim 1, wherein the duration of the continuous solvothermal treatment is adjusted by controlling the residence time of the reaction medium in the solvothermal treatment zone, in which said reaction medium is subjected to the temperature and pressure of the solvothermal treatment.

7. The process according to claim 1, wherein the reaction medium is continuously circulated in the reactor so that said reaction medium has a residence time in the solvothermal treatment zone of less than 10 minutes.

8. The process according to claim 1, wherein said reaction medium is introduced into the solvothermal treatment zone with a flow rate chosen to obtain the appropriate residence time.

9. The process according to claim 1, wherein said solvothermal treatment is performed under temperature and pressure conditions such that said reaction medium is under supercritical conditions.

10. The process according to claim 1, wherein the reaction medium is prepared continuously from at least one first starting composition comprising at least one compound, named mineral compound, chosen from silicates and/or germanates, solid solutions thereof and mixtures thereof, and of at least one second starting composition comprising at least one metal salt of at least one metal M selected from the group consisting of divalent metals and trivalent metals, said first and second compositions being placed in contact continuously upstream of at least one inlet of said solvothermal treatment zone.

11. The process according to claim 10, wherein said first starting composition is introduced continuously into at least one first pipe portion and said second starting composition is introduced continuously into at least one second pipe portion, each of the first pipe portion and of the second pipe portion being connected together upstream of the solvothermal treatment zone to allow the continuous placing in contact of these two compositions.

12. The process according to claim 11, wherein the first pipe portion and the second pipe portion join together upstream of at least one inlet of the solvothermal treatment zone, in a third pipe portion connecting together each of the first and second pipe portions and the inlet of the solvothermal treatment zone.

13. The process according to claim 1, wherein, for the preparation of phyllosilicate synthetic particles belonging to the group consisting of lamellar silicates, lamellar germanates, lamellar germanosilicates and mixtures thereof, wherein a precursor silico/germano-metallic hydrogel is used as precursor gel, and said solvothermal treatment is performed in the form of a continuous hydrothermal treatment of this precursor silico/germano-metallic hydrogel.

14. The process according to claim 13, wherein use is made, as precursor gel, of a precursor silico/germano-metallic hydrogel comprising:
4 silicon and/or germanium atoms according to the following chemical formula: 4 $(Si_xGe_{1-x})$, x being a real number of the interval [0; 1],
3 atoms of at least one metal M, M denoting at least one divalent metal having the formula $Mg_{y(1)}Co_{y(2)}Zn_{y(3)}Cu_{y(4)}Mn_{y(5)}Fe_{y(6)}Ni_{y(7)}Cr_{y(8)}$ in which each y(i) represents a real number of the interval [0; 1], and such that $$\sum_{i=1}^{8} y(i) = 1,$$

(10−ε) oxygen atoms ((10−ε) O), ε being a real number of the interval [0; 10],
(2+ε) hydroxyl groups ((2+ε) (OH)), ε being a real number of the interval [0; 10],
and said hydrothermal treatment is performed so as to obtain continuously a suspension comprising phyllosilicate particles having the chemical formula (II) below:

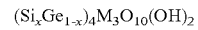  (II)

in which:
  Si denotes silicon,
  Ge denotes germanium,
  M denotes at least one divalent metal having the formula $Mg_{y(1)}Co_{y(2)}Zn_{y(3)}Cu_{y(4)}Mn_{y(5)}Fe_{y(6)}Ni_{y(7)}Cr_{y(8)}$; each y(i) representing a real number of the interval [0; 1], and such that $$\sum_{i=1}^{8} y(i) = 1,$$

x is a real number of the interval [0; 1].

15. A process for preparing phyllomineral synthetic particles formed from chemical elements, named constituent chemical elements, in predetermined proportions, named stoichiometric proportions, said constituent chemical elements comprising at least one chemical element selected from the group consisting of silicon and germanium, and at least one chemical element selected from the group consisting of divalent metals and trivalent metals, via a solvothermal treatment of a reaction medium comprising a liquid medium and containing said stoichiometric proportions of said constituent chemical elements of said phyllomineral synthetic particles, said phyllomineral synthetic particles belonging to the group of non-swelling phyllosilicates,
  in which:
    said solvothermal treatment is performed continuously at a pressure greater than 1 MPa and at a temperature of between 100° C. and 600° C.,
    the reaction medium is continuously circulated in a solvothermal treatment zone of a continuous reactor with a residence time of the reaction medium in said solvothermal treatment zone that is suitable for continuously obtaining, at the outlet of said solvothermal treatment zone, a suspension comprising said phyllomineral synthetic particles,
    wherein the concentration relative to the volume of the liquid medium of said constituent chemical elements of said phyllomineral synthetic particles introduced into the inlet of the solvothermal treatment zone of the reactor is between $10^{-3}$ mol/L and 1 mol/L.

* * * * *